(12) United States Patent
Sato et al.

(10) Patent No.: US 7,449,519 B2
(45) Date of Patent: Nov. 11, 2008

(54) CURING RESIN, METHOD FOR PRODUCING SAME AND CURING RESIN COMPOSITION

(75) Inventors: Shinichi Sato, Saitama (JP); Yukihiro Nomura, Saitama (JP); Jun Inui, Saitama (JP)

(73) Assignee: Konishi Co., Ltd. (JP)

( * ) Notice: Subject to any disclaimer, the term of this patent is extended or adjusted under 35 U.S.C. 154(b) by 511 days.

(21) Appl. No.: 10/546,017

(22) PCT Filed: Feb. 16, 2004

(86) PCT No.: PCT/JP2004/001627

§ 371 (c)(1),
(2), (4) Date: Aug. 18, 2005

(87) PCT Pub. No.: WO2004/074330

PCT Pub. Date: Sep. 2, 2004

(65) Prior Publication Data
US 2006/0079605 A1    Apr. 13, 2006

(30) Foreign Application Priority Data
Feb. 18, 2003    (JP) .............................. 2003-039305

(51) Int. Cl.
C08F 8/00    (2006.01)
(52) U.S. Cl. ............................ 525/100; 528/25; 528/27
(58) Field of Classification Search ................ 525/102, 525/100; 528/25, 27
See application file for complete search history.

(56) References Cited

U.S. PATENT DOCUMENTS 3,404,109 A    10/1968    Milgrom
3,717,617 A *  2/1973    Marrs et al. .................. 528/293
5,093,389 A    3/1992    Shimizu
5,912,319 A *  6/1999    Zook et al. .................. 528/373

FOREIGN PATENT DOCUMENTS

| EP | 0 449 413 A | 10/1991 |
| EP | 0 789 036 A | 8/1997 |
| JP | 46-27250 | 7/1971 |
| JP | 63-83160 | 4/1988 |
| JP | 2-238045 | 9/1990 |
| JP | 04-145123 | 5/1992 |
| JP | 06-293784 | 10/1994 |
| JP | 08-337713 | 12/1996 |
| JP | 2000-169544 | 6/2000 |
| JP | 2000-169545 | 6/2000 |
| JP | 3317353 | 6/2002 |

OTHER PUBLICATIONS

Database WPI, Section Ch, Week 199513, Derwent Publications Ltd., London, GB; AN 1995-094050, XP-002378889 & JP 07 018239 A (Sunstar Giken KK); Jan. 20, 1995, Abstract.

* cited by examiner

Primary Examiner—Randy Gulakowski
Assistant Examiner—Olatunde S Ojurongbe
(74) Attorney, Agent, or Firm—Kilpatrick Stockton LLP

(57) ABSTRACT

An object of the present invention is to provide a curable resin having a silyl group at the terminal that is also moisture-hardening resin which has lower in viscosity when it is used and provides superior adhesiveness when it is utilized for adhesive, sealant, and paint. The object of the invention could be achieved by a curable resin that has silicon atom-containing groups having a silicon atom bound to one or more hydrolysable groups such as alkoxy groups, acetoxy groups and oxim groups at the ends of the molecule, thioether and hydroxyl groups in the molecule, and a polymer having a polyoxyalkylene, (meth)acrylic ester, or hydrocarbon polymer as the main chain skeleton.

9 Claims, No Drawings

CURING RESIN, METHOD FOR PRODUCING SAME AND CURING RESIN COMPOSITION

TECHNICAL FIELD

The invention relates to a curable resin, a production method thereof, and a composition containing the curable resin, and in particular to a curable resin favorable for use in applications such as adhesive, sealant, and paint, a production method thereof, and a composition containing the curable resin exhibiting superior adhesiveness in such applications.

BACKGROUND OF THE INVENTION

The silylated urethane resins disclosed in U.S. Pat. Nos. 3,030,020 and 3,350,011, which are favorably adhesive to a wide variety of materials and environmentally friendly, are resins meeting the demands of the times and thus, resins of practical use in general adhesion applications. However, the silylated urethane resins are more viscous because of the urethane bonds contained therein, resulting in restriction on blending ratio of components for various adhesives and sealants. Further, the modified silicone resins having a polyoxyalkylene polymer as the main chain skeleton disclosed in Japanese Patent Application Laid-Open (JP-A) No. 08-337713 and others are less viscous, but not sufficiently adhesive because the resins do not have active hydrogen atoms in the molecular skeleton, and thus there exists a need for improvement in adhesiveness.

Further, silylated urethane resins having a (meth)acrylic ester polymer or a hydrocarbon polymer as the main chain skeleton are also known, but they are highly viscous, causing a problem in processability.

Furthermore, a curable epoxy compound containing hydroxyl groups and a thioether group in the molecule which is a reaction product from a hydrolysable silyl group-containing mercaptosilane and an epoxy compound, was described in JP-A No. 06-293784, but the curable epoxy compound is also highly viscous, causing the problem in processability.

An object of the present invention is to provide a curable resin having a silyl group at the terminal that is also moisture-hardening resin lower in viscosity and superior in adhesiveness, a production method thereof, and a composition containing the same as a component.

After intensive studies, the inventors have found that the object of the invention could be achieved by a resin prepared by an active hydrogen in the molecule of a polymer having an polyoxyalkylene, (meth)acrylic ester, or hydrocarbon as the main chain skeleton and an allyl group at the terminal by modification, and additionally introducing a hydrolysable alkoxysilyl group, not via a urethane bond, at the terminal thereof, and completed the invention.

SUMMARY OF THE INVENTION

The invention provide a curable resin represented by the following General Formula (1) or (2).

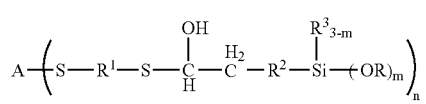
(1)

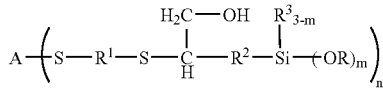
(2)

In the General Formula, A represents a reactive residue of a polyvalent allyl compound having a polymer containing an polyoxyalkylene, (meth)acrylic ester or hydrocarbon as the main chain skeleton and having an allyl group at the terminal; n is a number of 1 to 20; R represents an alkyl group having 1 to 6 carbon atoms; $R^1$ represents a bivalent organic group having a molecular weight of 10,000 or less; $R^2$ represents a bivalent organic group having a molecular weight of 200 or less; $R^3$ represents a hydrogen atom or an alkyl group having 1 to 6 carbon atoms; and m is a number of 1 to 3.

The invention also provides a method of producing the curable resin, comprising the steps of: reacting a polyvalent allyl compound represented by the following General Formula (3) (compound a) with a polyvalent thiol compound represented by the following General Formula (4) (compound b) to give a terminal thiol compound represented by the following General Formula (5) (synthetic product A); and then reacting the synthetic product A with an epoxysilane compound represented by the following General Formula (6) (compound c).

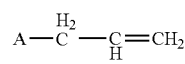
(3)

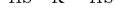
(4)

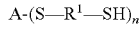
(5)

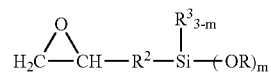
(6)

In the General Formula above, A, n, R, $R^1$, $R^2$, $R^3$ and m are the same as those described above.

In addition, the invention also provide a method of producing a curable resin, comprising the steps of: preparing a mercaptosilane compound (synthetic product B) represented by the following General Formula (7) or (8) by reacting the compounds b and c; and then reacting the synthetic product B obtained with the compound a.

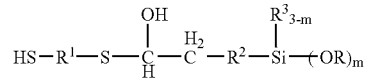
(7)

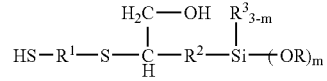
(8)

In the General Formula above, R, $R^1$, $R^2$, $R^3$ and m are the same as those described above.

Further, the invention provides a curable resin composition (composition 1), comprising: 100 parts by weight of the curable resin; and 5 to 1,000 parts by weight of a vinyl polymer prepared by polymerization of a polymerizable vinyl monomer.

Further, the invention provides a curable resin composition (composition 2), further comprising a polymer formed from a compound having a reactive silicon group in the molecule, and having one or more nitrogen or sulfur atom-containing bonds selected from (thio)urethane, urea, substituted urea, and Michael addition reaction-derived chemical bonds or having a hydroxyl group. The polymer content is 1 to 50 wt % with respect to the total weight of the polymer and the vinyl polymer.

The invention further provides a method of producing the curable resin composition (composition 1), wherein a polymerizable vinyl monomer is polymerized in the curable resin.

The invention further provides a method of producing the curable resin composition (composition 2), wherein a polymerizable vinyl monomer and a compound having a reactive silicon group in the molecule, and having one or more nitrogen or sulfur atom-containing bond selected from (thio)urethane, urea, substituted urea and Michael addition reaction-derived chemical bonds or having a hydroxyl group are polymerized in the curable resin.

The invention further provides an adhesive composition (composition 3), comprising the curable resin and a curing catalyst for the curable resin.

The invention further provides an adhesive composition (composition 4), comprising the curable resin composition (composition 1 or 2) and a curing catalyst for curable resin.

BEST MODE OF CARRYING OUT THE INVENTION

The invention relates to a curable resin represented by the following General Formula (1) or (2) that has silicon atom-containing groups having a silicon atom bonded to one or more hydrolysable alkoxy groups at the ends of the molecule, having thioether and hydroxyl groups in the molecule, and having a polymer containing a polyoxyalkylene polymer, (meth)acrylic ester polymer or hydrocarbon polymer as the main chain skeleton.

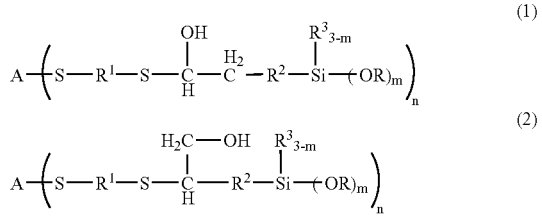

In the General Formula above, A represents a reactive residue of a polyvalent allyl compound having a polymer containing a polyoxyalkylene, (meth)acrylic ester or hydrocarbon polymer as the main chain skeleton and having an allyl group at the terminal; n is a number of 1 to 20; R represents an alkyl group having 1 to 6 carbon atoms; $R^1$ represents a bivalent organic group having a molecular weight of 10,000 or less; $R^2$ represents a bivalent organic group having a molecular weight of 200 or less; $R^3$ represents a hydrogen atom or an alkyl group having 1 to 6 carbon atoms; and m is a number of 1 to 3.

The polymer having a polyoxyalkylene polymer as the main chain skeleton is preferably a terminal hydroxyl group-containing polymer prepared, for example, by allowing a monoepoxide react to with the polyoxyalkylene polymer in the presence of an initiator and a catalyst. The initiator for use is, for example, a compound having one or more hydroxyl groups.

Examples of the monoepoxides for use include ethylene oxide, propylene oxide, butylene oxide, hexylene oxide, tetrahydrofuran, and the like. Examples of the catalysts include alkali metal catalysts such as potassium compounds and cesium compounds, complex metal cyanide compound catalysts, and metal porphyrin catalysts. Favorable examples of the complex metal cyanide compound catalysts include complexes containing zinc hexacyanocobaltate as the principal component, and the ether and/or alcohol complexes thereof. The ether and/or alcohol complexes described in Japanese Patent Application Publication (JP-B) No. 46-27250 may be used essentially as the ether and/or alcohol complex. Favorable examples of the ethers include ethylene glycol dimethylether (glyme), diethylene glycol dimethylether (diglyme), and the like; and glyme is particularly preferable from the point of handling during complex production. The alcohols described, for example, in JP-A No. 4-145123 may be used as the alcohol, and tert-butanol is particularly preferable.

The polyoxyalkylene polymer preferably has two or more functional groups, and examples thereof include polyoxyethylene, polyoxypropylene, polyoxybutylene, polyoxyhexylene, polyoxytetramethylene, and the like. A preferable polyoxyalkylene polymer is a bivalent to hexavalent polyoxyalkylene polyol or polyoxypropylene polyol, or the mixture thereof. Examples of the polyoxyethylene polyols include polyoxyethylene diol, while examples of the polyoxypropylene polyols include polyoxypropylene diol and polyoxypropylene triol.

Polyoxyalkylene polymers are commercially available, and the commercial products may be used in the invention. Examples of the commercial products include P-2000, P-3000, PR3007, and PR5007 (trade name, manufactured by Asahi Denka); PML-3005, PML-3010, PML-3012, PML-4002, PML-4010, PML-S-4012, PML-4016, and PML-5005 (tradename, manufactured by Asahi Glass); Sumiphen 3700, and SBU-polyol 0319 (trade name, manufactured by Sumitomo Bayer Urethane); and the like.

Examples of the (meth)acrylic ester polymers include acrylic or methacrylic ester homopolymers, copolymers of an (meth)acrylic ester and other (meth)acrylic esters, copolymers of the (meth)acrylic ester and a vinyl monomer such as vinyl acetate, acrylonitrile, or styrene, and the like. Examples of the acrylic or methacrylic esters include an ester or a combination of two or more esters selected from alkyl (meth) acrylates [(Meth)acrylate means acrylate and methacrylate. The same shall apply hereinafter.] such as methyl (meth) acrylate, ethyl (meth)acrylate, n-propyl (meth)acrylate, n-butyl (meth)acrylate, isobutyl (meth)acrylate, t-butyl (meth) acrylate, 2-ethylhexyl (meth)acrylate, stearyl (meth)acrylate, lauryl (meth)acrylate, and tridecyl (meth)acrylate; alkoxy alkyl (meth)acrylates such as ethoxyethyl (meth)acrylate and butoxyethyl (meth)acrylate; alkoxyalkoxyalkyl (meth) acrylates such as 2-methoxyethoxyethyl (meth)acrylate and 2-ethoxyethoxyethyl (meth)acrylate; alkoxy(poly)alkylene glycol (meth)acrylates such as methoxydiethylene glycol (meth)acrylate, ethoxydiethylene glycol (meth)acrylate, methoxytriethylene glycol (meth)acrylate, butoxytriethylene glycol (meth)acrylate, and methoxydipropylene glycol (meth)acrylate; pyrenoxide adducts of (meth)acrylates; dialkylaminoalkyl (meth)acrylates such as N,N-dimethylaminoethyl (meth)acrylate, and N,N-diethylaminoethyl (meth)acrylate; and the like.

Examples of the hydrocarbon polymers include polymers formed using a monoolefin having 1 to 6 carbon atoms such as ethylene, propylene, 1-butene, isobutene, and 1-hexene as the primary monomer; diolefinic homopolymers formed from a monomer such as butadiene and isoprene; hydrogenated derivatives of the copolymers formed using of the diolefin and the monoolefin; and the like. Among these hydrocarbon polymers, polymers formed using isobutene as the mainly used monomer and hydrogenated derivatives formed using butadiene polymers are preferable, because it is easier to introduce a functional group to the terminal of these polymers and adjust the molecular weight thereof, and it is also possible to increase the number of the terminal functional groups.

The polymers formed using an isobuten as the primary monomer may include homopolymers formed from a isobutene and also copolymers formed from an isobutene and another copolymerizable monomer in an amount of 50 wt % or less, preferably 30 wt % or less, and more preferably 10 wt % or less.

The monomers copolymerizable with isobutene include olefins having 4 to 12 carbon atoms, vinylethers, aromatic vinyl compounds, vinylsilanes, and allylsilanes, and the like. Such examples of such monomers include 1-butene, 2-butene, 2-methyl-1-butene, 3-methyl-1-butene, 1-pentene, 4-methyl-1-pentene, 1-hexene, vinylcyclohexene, methylvinylether, ethylvinylether, isobutylvinylether, styrene, a-methylstyrene, divinylstyrene, vinyltrimethoxysilane, vinyltriethoxylsilane, allylaminotrimethylsilane, allyldimethoxysilane, and the like.

The polymer having a polyoxyalkylene polymer, (meth)acrylic ester polymer, or hydrocarbon polymer as the main chain skeleton preferably has a number-average molecular weight of 500 to 30,000, and particularly preferably 2,000 to 20,000. Among the polymers having an polyoxyalkylene polymer, (meth)acrylic ester polymer, and hydrocarbon polymer as the main chain skeleton, a polyoxyalkylene polymer is preferable.

In General Formula (1) or (2) above, n is a number of 1 to 20, and particularly preferably 2 to 3. In General Formula (1) or (2) above, the alkoxy group represented by OR is an alkylalkoxy group having 1 to 6 carbon atoms and particularly preferably a methoxy or ethoxy group. Examples of the bivalent organic groups represented by $R^1$ having a molecular weight of 10,000 or less include alkylene groups having 1 or more carbon atoms that may have side chains, arylene groups having 6 or more carbon atoms that may have side chains, groups represented by Formula —$CH_2CHR^4(X)_qCHR^5(Y)_rCH_2$— (wherein, $R^4$ represents a hydrogen atom or a hydroxyl group; X represents a sulfur or oxygen atom; q is a number of 0 or 1 or more; $R^5$ represents a hydrogen atom or a hydroxyl group; Y represents a sulfur or oxygen atom; r is a number of 0 or 1 or more), and the like.

The curable resin according to the invention can be prepared by a method (1) of preparing a terminal thiol compound represented by the following General Formula (5) (synthetic product A) by reacting the polyvalent allyl compound represented by the following General Formula (3) (compound a) with the polyvalent thiol compound represented by the following General Formula (4) (compound b) and further reacting the synthetic product A with the epoxysilane compound represented by the following General Formula (6) (compound c); or a method (2) of preparing a mercaptosilane compound (synthetic product B) represented by General Formula (7) or (8) by reacting the compound b with the compound c, and further reacting the synthetic product B with the compound a.

(3)

(4)

(5)

(6)

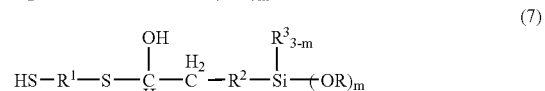

(7)

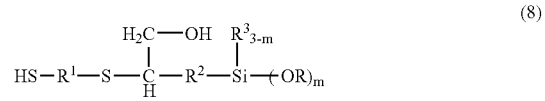

(8)

In the General Formula above, A, n, R, $R^1$, $R^2$, $R^3$ and m are the same as those described above.

The compound a has typically a number-average molecular weight in the range described above, and can be prepared by reacting a polymer having a polyoxyalkylene, (meth)acrylicester, or hydrocarbon polymer as the main chain skeleton and a hydroxyl group at the terminal with an alkali metal, alkali metal hydride, alkali metal alkoxide or alkali metal hydroxide, or the like and an organic halogen compound having 3 to 10 carbon atoms that has an allyl group at the terminal.

The alkali metal is preferably sodium or potassium, and the organic halogen compound is preferably allyl chloride, allyl bromide, vinyl(chloromethyl)benzene, allyl(chloromethyl) benzene, allyl(chloromethyl)ether, or the like.

The compounds a are commercially available, and such commercial products may also be used. Examples of the commercial products include LX-1164, ARA-2000, and ARA-4000 (trade name, manufactured by Asahi Denka, trade name) and the like.

Examples of the compounds b include 1,5-dimercapto-3-thiapentane (DMDS), 1,8-dimercapto-3,6-dioxaoctane (DMDO), 1,2-ethanedithiol, 1,2-propanedithiol, 1,3-propanedithiol, 1,2-butanedithiol, 1,3-butanedithiol, 2,3-butanedithiol, 1,4-butanedithiol, 2,5-dimercapto-1,3,4-thiadiazole, dimercaptobenzene, dimercaptotoluene, dimercaptoxylene, dimercaptonaphthalene, (±)-dithiothreitol, dithioerythritol, and the like; and in addition, compounds having a spirane ring skeleton and having thiol groups at both ends are also included.

Examples of the compounds c include β-(3,4-epoxycyclohexyl)ethyltrimethoxysilane, γ-glycidoxypropyltrimethoxysilane, γ-glycidoxyprbpylmethyldimethoxysilane, γ-glycidoxypropyltriethoxylsilane, γ-glycidoxypropylmethyldiethoxysilane, and the like.

The reaction between the compounds a and b is conducted by reacting the compound a with compound b in an amount of 0.5 mole or more, preferably 0.6 to 2.0 moles with respect to 1 mole of the allyl group in compound a. These compounds are reacted with each other at a temperature range of 40 to 150° C. for 1 to 500 hours. The radical addition is performed in the presence of a radical initiator. Examples of the radical initiators for use include azo compounds such as 2,2'-azobisisobutylonitrile and 2,2'-azobis(2-methylbutylonitrile), and peroxides such as benzoylperoxide, t-alkylperoxy esters, acetyl peroxide, and diisopropylperoxy carbonate. The radical addition can also be initiated by UV irradiation. The radical addition may be performed in the presence of an organic solvent. Examples of the organic solvents include aliphatic hydrocarbons such as hexane and heptane, aromatic hydrocarbons such as benzene, toluene, and xylene, alicyclic hydrocarbons such as cyclohexane and cycloheptene, and the like.

The reaction of the synthetic product A obtained in the reaction of compounds a and b with compound c is carried out at the equimolar amounts, but the synthetic product A is reacted with the compound c in an amount preferably of 0.4 mole or more, particularly preferably of 0.6 to 1.2 moles, with respect to 1 mol of the thioether group in synthetic product A. The synthetic product A and the compound c are reacted in a temperature range of 20 to 150° C. for 1 to 500 hours. In addition, in the reaction between the synthetic product A and the compound c, an amine compound, for example, may be added.

Examples of the amine compounds include aliphatic amines such as ethylenediamine, diethylenetriamine, triethylenetetramine, tetraethylenepentamine, diethylaminopropylamine, hexamethylenediamine, methylpentamethylenediamine, trimethylhexamethylenediamine, guanidine, trimethylamine, triethylamine, and oleylamine; alicyclic amines such as menthenediamine, isophoronediamine, norbornanediamine, piperidine, N,N'-dimethylpiperazine, N-aminoethylpiperazine, 1,2-diaminocyclohexane, bis(4-amino-3-methylcyclohexyl)methane, bis(4-amino-methylcyclohexyl)methane, polycyclohexylpolyamine, and 1,8-diazabicyclo[5,4,0]undecene-7 (DBU); aromatic amines such as meta-phenylenediamine and 4,4'-diaminodiphenylsulfone; aliphatic aromatic amines such as m-xylylenediamine, benzyl dimethylamine, 2-(dimethylaminomethyl)phenol, and 2,4,6-tris(dimethylaminomethyl)phenol; ether bond-containing amines such as 3,9-bis(3-aminopropyl)-2,4,8,10-tetraoxaspiro[5,5]undecane (ATU), morpholine, N-methylmorpholine, polyoxypropylenediamine, polyoxypropylenetriamine, and polyoxyalkylenediamine; hydroxyl group-containing amines such as diethanolamine and triethanolamine; polyamide amines such as polyamides prepared by reacting a dimer acid or a polycarboxylic acid other than dimer acids with a polyamine such as diethylenetriamine and diethylenetetramine; imidazoles such as 2-ethyl-4-methylimidazole; dicyandiamide; polyoxypropylene amines such as polyoxypropylenediamine and polyoxypropylenetriamine; modified amines such as epoxy-modified amines prepared by reacting an amine with an epoxy compound, Mannich-modified amines prepared by reacting an amine with a formalin and a phenol, Michael addition-modified amines, and ketimines; amine salts such as 2,4,6-tris(dimethylaminomethyl)phenol 2-ethylhexanoate salt; and the like.

The reaction between the compounds b and c is carried out by using the compound c in an amount of 0.01 to 1.9 moles, preferably 0.05 to 1.5 moles, and particularly preferably 0.2 to 1.2 moles, with respect to 1 mole of the compound b. The compounds are reacted in a temperature range of $-20°$ C. to $150°$ C. for 0.5 to 2,000 hours. The amine compound may be added as a catalyst at the time. The reaction product may be used as it is or after purification, for example, by distillation.

The reaction of the synthetic product B prepared in the reaction between the compounds b and c with the compound a is performed by allowing radical addition of the compound a to the synthetic product B in such an amount that the thioether-group compound b in synthetic product B in an amount of 0.4 mole or more, preferably 0.6 to 1.2 moles, with respect to 1 mole of the allyl group in compound a. These compounds are reacted in a temperature range of 40 to 150° C. for 1 to 500 hours. The radical addition is performed in the presence of a radical initiator. Examples of the radical initiators include the compounds described above. The radical addition can also be performed by UV irradiation. The radical addition may be performed in the presence of the organic solvent described above.

The curable resin according to the invention can be produced as described above, and the invention relates to a composition containing the curable resin as a component. The compositions include a curable resin composition containing 100 parts by weight of the curable resin above and 5 to 1,000 parts by weight of a vinyl polymer prepared by polymerization of a polymerizable vinyl monomer (composition 1); an adhesive composition containing, in addition to the composition 1, a polymer prepared from a compound having a reactive silicon group in the molecule and having one or more nitrogen or sulfur atom-containing bonds selected from (thio)urethane, urea, substituted urea, and Michael addition reaction-derived chemical bonds or having a hydroxyl group in an amount of 1 to 50 wt % with respect to the total weight of the said polymer and vinyl polymer (composition 2); an adhesive composition containing the curable resin above and a curing catalyst for curable resin (composition 3); and an adhesive composition containing the composition 1 or 2 and a curing catalyst for the curable resin (composition 4).

The composition 1 according to the invention contains 100 parts by weight of the curable resin and 5 to 1,000 parts by weight of a vinyl polymer prepared by polymerization of a polymerizable vinyl monomer. It is possible to improve, for example, the toughness and adhesiveness of the curable resin by blending the vinyl polymer (hereinafter, referred to as polymer (C)) to the curable resin. Examples of the polymerizable vinyl monomer for the polymer (C) (hereinafter, referred to as compound (d)) include compounds such as acrylic acid, methacrylic acid, acrylic esters and methacrylic esters (hereinafter, referred to as (meth)acrylic compounds) and compounds containing a vinyl group in the molecule other than the (meth)acrylic compounds (hereinafter, referred to as vinyl compounds). The compound (d) represented by the (meth)acrylic and vinyl compounds may be used alone or in combination of two or more.

Examples of the (meth)acrylic compounds and vinyl compounds include methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, pentyl (meth)acrylate, amyl (meth)acrylate, isoamyl (meth)acrylate, hexyl (meth)acrylate, heptyl (meth)acrylate, octyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, octadecyl (meth)acrylate, stearyl (meth)acrylate, tetrahydrofurfuryl (meth.)acrylate, butoxyethyl (meth)acrylate, ethoxydiethylene glycol (meth)acrylate, benzyl (meth)acrylate, cyclohexyl (meth)acrylate, phenoxyethyl (meth)acrylate, polyethylene glycol (meth)acrylate, polypropylene glycol (meth)acrylate, methoxyethylene glycol (meth)acrylate, ethoxyethylene glycol (meth)acrylate, methoxypolyethylene glycol (meth)acrylate, methoxypolypropylene glycol (meth)acrylate, dicyclopentadienyl (meth)acrylate, dicyclopentanyl (meth)acrylate, dicyclopentenyl (meth)acrylate, tricyclodecanyl (meth)acrylate, bornyl (meth)acrylate, isobornyl (meth)acrylate, diacetone (meth)acrylate, isobutoxymethyl (meth)acrylate, N-vinylpyrrolidone, N-vinylcaprolactam, N-vinylformaldehyde, N,N-dimethyl(meta)acrylamide, t-octyl(meta)acrylamide, dimethylaminoethyl (meth)acrylate, diethylaminoethyl (meth)acrylate, 7-amino-3,7-dimethyloctyl (meth)acrylate, N,N-dimethyl(meta)acrylamide, N,N'-dimethylaminopropyl(meta)acrylamide, acryloylmorpholine, and the like; as well as Light Ester M, Light Ester E, Light Ester NB, Light Ester IB, Light Ester EH, Light Ester ID, Light Ester L, Light Ester L-5, Light Ester L-7, Light Ester TD, Light Ester L-8, Light Ester S, Light Ester MC, Light Ester 130 MA, Light Ester 041 MA, Light Ester CH, Light Ester THF, Light Ester BZ, Light Ester PO, Light Ester IB-X, Light Ester HO, Light Ester HOP, Light Ester HOA, Light Ester HOP-A, Light Ester HOB, Light Ester DM, Light Ester DE, Light Ester A, Light Ester HO-MS, Light Ester HO-HH, Light Ester HO-MPP, Light Ester G, Light Ester TB, Light Ester IS, Light Ester MTG, Light Ester BO, Light Ester CL, Light Ester M-3F, Light Ester M-4F, Light Ester M-6F, Light Ester FM-108, Light Acrylate IAA, Light Acrylate L-A, Light Acrylate S-A, Light Acrylate BO-A, Light Acrylate EC-A, Light Acrylate MTG-A, Light Acrylate 130A, Light Acrylate DPM-A, Light Acrylate PO-A, Light Acrylate P-200A, Light Acrylate NP-4EA, Light Acrylate NP-8EA, Light Acrylate THF-A, Light Acrylate IB-XA, Light Acrylate HO-A, Light Acrylate HOP-A, Epoxy Ester M-600A, HOA-MPL, HOA-MPE, Light Acrylate IO-A, Light Acrylate M-A, Light Acrylate IS-A, Light Acrylate EHDG-A, Light Acrylate OB-A, OA-HH, Light Acrylate FA-108, and Light Acrylate P2H-A (trade name, manufactured by Kyoeisha Chemical Co., Ltd.); Diacetone Acrylamide (trade name, manufactured by Kyowa Hakko Kogyo Co., Ltd.); Karenz MOI-BM (trade name, Showa Denko K.K.); 4-hydroxybutyl acrylate manufactured by Mitsubishi Chemical Corp.; Veova 9 and Veova 10 (trade name, manufactured by Shell Chemicals); NK Ester M-20G, NK Ester M-40G, NK Ester M-90G, NK Ester M-230G, NK Ester CB-1, K Ester SA, Toporen M, NK Ester S, NK Ester AMP-10G, NK Ester AMP-20G, NK Ester AMP-20GY, NK Ester AMP-60G, NK Ester AM-30G, NK Ester AM-90G, NK Ester A-SA, NK Ester LA, NK Ester CMP-1E, NK Ester NPA-10G, NK Ester NPA-5E, NK Ester NPA-5P, NK Ester LMA, NK Ester ACB-21, NK Ester CB-23, NK Ester CB-26, NK Ester CBX-1, NK Ester A-IB, NK Ester IB, NK Ester A-MO, NK Ester 702A, NK Ester A-OC-18E, NK Ester S-1800A, NK Ester S-1800 M, NK Ester A-L4, NK Ester #401P, NK Ester A-NP-1E, NK Oligo EA-5120, NK Oligo EA-5122, and NK Oligo EA-5123 (trade name, manufactured by Shin-Nakamura Chemicals); New Frontier PHE, New Frontier PHE-2, New Frontier NP-2, New Frontier NP-4, New Frontier ME-3, New Frontier EH-2, New Frontier IBA, New Frontier DPGA, New Frontier MPEM-400, New Frontier NPEM-1000, New Frontier BR-30, New Frontier BR-30M, New Frontier BR-31(trade name, manufactured by Dai-ichi Kogyo Seiyaku); Celoxide 2000, MVE, Placcel FM1, Placcel FM1D, Placcel FM2D, Placcel FM3, Placcel FM3X, Placcel FM4, Placcel FM4X, Placcel FM4DX, Placcel FM5, Placcel FM5L, Placcel FM6X, Placcel FA1DT, Placcel FA2D, Placcel FA3, Placcel FA4DT, Placcel FA5, Placcel FA10L, Placcel FD101, Placcel FD102, Placcel FD201, Placcel FD202, Placcel FM1A, Placcel FM4A, Placcel FM10A, Cyclomer M100, Cyclomer A200, and HEMAC, M-GMA (trade name, manufactured by Daicel Chemical Industries, Ltd.); Neoallyl G (trade name, manufactured by Daiso Co., Ltd.); Aronix M-101, Aronix M-102, Aronix M-110, Aronix M-111, Aronix M-113, Aronix M-114, Aronix M-117, Aronix M-120, Aronix M-150, Aronix M-156, Aronix M-5300, Aronix M-5400, Aronix M-5600, and Aronix M-5700 (trade name, manufactured by Toagosei Co., Ltd.); Denacol Acrylate DA-141 (trade name, manufactured by Nagase Chemitex Corp.); Blenmer BMA, Blenmer IBMA, Blenmer CHMA, Blenmer EHMA-25, Blenmer TBCHMA, Blenmer DSMA, Blenmer LMA, Blenmer SLMA, Blenmer PMA, Blenmer CMA, Blenmer SMA, Blenmer VMA, BlenmerB-12, Blenmer CHA, Blenmer LA, Blenmer SLA, Blenmer CA, Blenmer SA, Blenmer B-18A, Blenmer G, Blenmer GH, Blenmer GH-LC, Blenmer GS, Blenmer GLM, Blenmer GLM-R, Blenmer G-FA, Blenmer G-O, Blenmer G-SB, Blenmer E, Blenmer PE-90, Blenmer PE-200, Blenmer PE-350, Blenmer AE-90, Blenmer AE-200, Blenmer AE-400, Blenmer P, Blenmer PP-1000, Blenmer PP-500, Blenmer PP-800, Blenmer AP-150, Blenmer AP-400, Blenmer AP-550, Blenmer AP-800, Blenmer 50PEP-300, Blenmer 70PEP-350B, Blenmer AEP series, Blenmer 55PET-400, Blenmer 30PET-800, Blenmer 55PET-800, Blenmer AET series, Blenmer 30PPT-800, Blenmer 50PPT-800, Blenmer 70PPT-800, Blenmer APT series, Blenmer 10PPB-500B, Blenmer 10APB-500B, Blenmer PME-100, Blenmer PME-200, Blenmer PME-400, Blenmer PME-1000, Blenmer PME-4000, Blenmer AME-400, Blenmer 50POEP-800B, Blenmer 50AOEP-800B, Blenmer PLE-200, Blenmer ALE-200, Blenmer ALE-800, Blenmer PSE-200, Blenmer PSE-400, Blenmer PSE-1300, Blenmer ASEP series, Blenmer PKEP series, Blenmer ANE-300, Blenmer ANE-1300, Blenmer PNEP series, Blenmer PNPE series, Blenmer 43ANEP-500, and Blenmer 70ANEP-550 (trade name, manufactured by NOF Corporation); GE-110, MMA, EMA, GE-310, GE-320, EHMA, GE-410, GE-420, DPMA, SMA, GE-510, GE-610, GE-650, GE-710, GE-720, AMA, CHMA, and DAA (trade name, manufactured by Mitsubishi Gas Chemical Company); Acryester M, Acryester E, Acryester IB, Acryester TB, Acryester EH, Acryester L, Acryester SL, Acryester TD, Acryester S, Acryester CH, Acryester BZ, Acryester IBX, Acryester G, Acryester GU, Acryester THF, Acryester A, Acryester HO, Acryester HISS, Acryester HP, Acryester MT, Acryester ET, Acryester PA, Acryester HH, Acryester DM, Acryester DE, Acryester 3FE, and Acryester 17FE (trade name, manufactured by Mitsubishi Rayon Co., Ltd.); Kayahard TC110S, Kayahard R629, and Kayahard R644 (trade name, manufactured by Nippon Kayaku); Viscoat 3700 (trade name, manufactured by Osaka Organic Chemical Industries Ltd.); and the like.

Also included are polyfunctional compounds such as trimethylolpropane tri(meth)acrylate, pentaerythritol (meth)acrylate, pentaerythritol tetra(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentylglycol di(meth)acrylate, trimethylolpropane trioxyethyl (meth)acrylate, tris(2-hydroxyethyl) isocyanurate tri(meth)acrylate, tris(2-hydroxyethyl)isocyanurate di(meth)acrylate, tricyclodecanedimethanol di(meth)acrylate, and epoxy (meth)acrylates of the (meth)acrylate adduct with bisphenol A glycidylethers; as well as commercially available polyfunctional compounds such as Upimer UV, SA1002, and SA2007 (trade name, manufacture by Mitsubishi Chemical Corp), Viscoat 700 (trade name, manufactured by Osaka Organic Chemical Industries Ltd.), Kayahard R604, DPCA-20, DPCA-30, DPCA-60, DPCA-120, HX-620, D-310, and D-330 (trade name, manufactured by Nippon Kayaku), Aronix M-210, M-215, M-315, and M-325 (trade name, manufactured by Toagosei Co., Ltd.), and the like.

In addition to the compounds above, further included are compounds having an alkoxysilyl group such as γ-methacryloxypropyltrimethoxysilane, γ-methacryloxypropyltriethoxylsilane, γ-methacryloxymethyldimethoxysilane, γ-methacryloxymethyldiethoxysilane, γ-acryloxypropyltrimethoxysilane, γ-acryloxymethyldimethoxysilane, and the like.

The composition 2 according to the invention contains, in addition to the composition 1, a polymer prepared from a compound having a reactive silicon group in the molecule, and having one or more nitrogen or sulfur atom-containing bonds selected from (thio)urethane, urea, substituted urea, and Michael addition reaction-derived chemical bonds or having a hydroxyl group (hereinafter, referred to as compound (e)) in an amount of 1 to 50 wt % with respect to the total weight of the polymer and the vinyl polymer. The compounds (e) may be used alone or in combination of two or more. Examples of the compounds (e) include the following compounds (e-1) and (e-2), and the compounds can be produced respectively according to the following preparative methods.

(1) Compound (e-1)

Hydrolysable silicon group-containing unsaturated compounds prepared by reacting a monoisocyanate compound having the group represented by the following General Formula (9) or (10) and an isocyanate group in the molecule with the compound represented by the following General Formula (11), (12), (13), (14), (15), (16), (17) or (18).

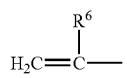
(9)

(10)

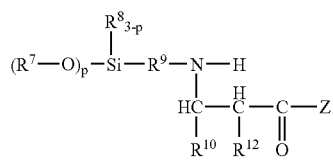
(11)

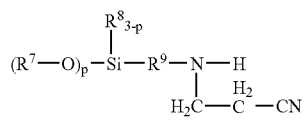
(12)

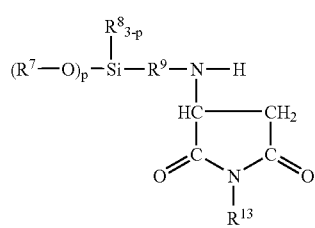
(13)

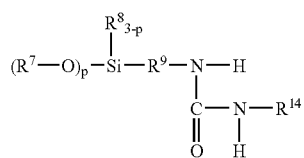
(14)

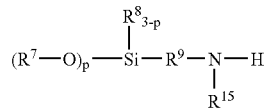
(15)

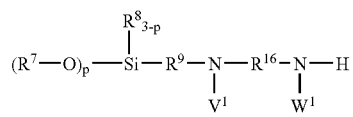
(16)

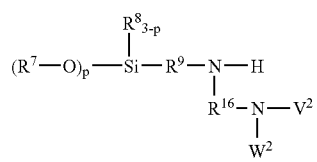
(17)

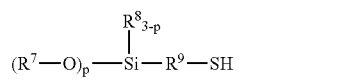
(18)

In General Formula (9) above, $R^6$ represents a hydrogen atom or a methyl group; and in General Formula (11) to (18) above, $R^7$ represents a hydrogen atom or an alkyl group having 1 to 6 carbon atoms; $R^8$ represents a hydrogen atom or an alkyl, aryl, or aralkyl group having 1 to 20 carbon atoms; p is an integer of 1 to 3; $R^9$ represents an alkylene or arylene group having 1 to 10 carbon atoms that may have a side-chain; $R^{10}$ represents a hydrogen atom or a group represented by Formula —$COOR^{11}$ ($R^{11}$ represents an organic group having a molecular weight of 500 or less); $R^{12}$ represents a hydrogen atom or a methyl group; $R^{13}$ represents a phenyl group, a cyclohexyl group or a substituted or unsubstituted monovalent organic group having 1 to 20 carbon atoms; $R^{14}$ represents an alkyl, aryl, or aralkyl group having 1 to 20 carbon atoms; $R^{15}$ represents a hydrogen atom, a phenyl group, or a substituted or unsubstituted organic group having 1 to 20 carbon atoms; $R^{16}$ represents a substituted or unsubstituted bivalent organic group having a molecular weight of 500 or less; and Z represents a hydrogen atom, $OR^{17}$, $R^{17}$ or $NH_2$; $R^{17}$ represents a hydrogen atom, an organic group having a molecular weight of 500 or less, or a group represented by the following General Formula (19):

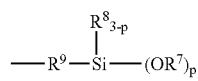
(19)

($R^7$, $R^8$, and $R^9$ are the same as those described above; and p is the same as that described above). $V^1$, $W^1$ and $V^2$ in General Formula (17) above each independently represent a group represented by the following General Formula (20), (21), (22) or (23); $W^2$ represents a group of General Formula (20), (21), (22) or (23) when $V^2$ is the group of General Formula (20), a group of General Formula (20), (21), (22) or (23) when $V^2$ is the group of General Formula (21), a group of General Formula (20), (21) or (22) when $V^2$ is the group of General Formula (23), and a hydrogen atom when $V^2$ is the group of General Formula (22).

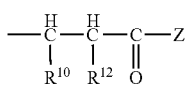 (20)

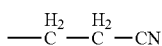 (21)

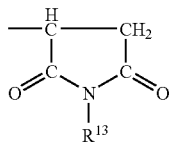 (22)

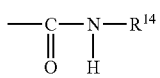 (23)

However, $R^{10}$, $R^{12}$ and Z in General Formula (20) above, $R^{13}$ in General Formula (22), and $R^{14}$ in General Formula (23) are the same as those described above.

Examples of the monoisocyanate compounds having the group represented by General Formula (9) or (10) above and an isocyanate group in the molecule include m-isopropenyl-a, a-dimethylbenzyl isocyanate, 2-methacryloyloxyethyl isocyanate, and the like. Commercial products of these compounds may also be used.

The monoisocyanate compound having the group represented by General Formula (9) or (10) above and an isocyanate group in the molecule can also be produced by reacting a diisocyanate compound with a compound represented by the following General Formula (24), (25) or (26).

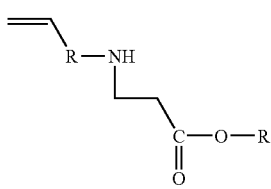

(24)

(25)

(26)

Hereinafter, the compounds represented by General Formula (11), (12), (13), (14), (15), (16), (17) and (18) above will be described.

The compound represented by the General Formula (11) can be produced by reacting a compound represented by the following General Formula (21) with a compound represented by the following General Formula (28). $R^7$, $R^8$, $R^9$ and p in the following General Formula (27) and $R^{10}$, $R^{12}$ and Z in the following General Formula (28) are the same as those described above. The reaction between the compound represented by General Formula (27) and the compound represented by General Formula (28) is carried out at 20 to 100° C. for 1 to 200 hours.

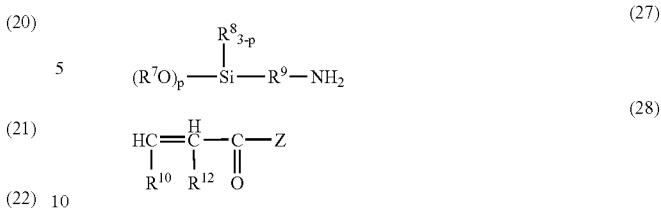

(27)

(28)

Examples of the compounds represented by General Formula (27) include γ-aminopropylmethyldimethoxysilane, γ-aminopropylmethyldiethoxysilane, γ-aminopropyltrimethoxysilane, γ-aminopropyltriethoxylsilane, γ-aminophenyltrimethoxysilane, and the like.

The compound represented by General Formula (28) is selected arbitrarily from (meth)acrylic compounds, vinylketone compounds, vinyl aldehyde compounds, and others, and the compounds may be used alone or in combination of two or more.

The (meth)acrylic compound is selected from the compounds (d). Examples of the vinylketone compounds include vinylacetone, vinylethylketone, vinylbutylketone, and the like; examples of the vinyl aldehyde compounds include acrolein, methacrolein, crotonaldehyde, and the like; examples of the maleic acid diesters include dimethyl maleate, diethyl maleate, dibutylmaleate, di-2-ethylhexyl maleate, dioctyl maleate, and the like; and examples of other compounds include maleic anhydride, itaconic anhydride, itaconic acid, crotonic acid, N-methylolacrylamide, diacetone acrylamide, N-[3-(dimethylamino)propyl]methacrylamide, N,N-dimethylacrylamide, N,N-diethylacrylamide, N-t-octylacrylamide, N-isopropylacrylamide, and the like.

In addition to the compounds above, included are compounds that contain a fluorine, sulfur, or phosphorus atom inside. Examples of the fluorine atom-containing compounds include perfluorooctylethyl (meth)acrylate and trifluoroethyl (meth)acrylate; and examples of the phosphorus atom-containing compounds include (meth)acryloxyethylphenyl acid phosphate and the like.

The compound represented by the General Formula (12) can be produced by reacting a compound represented by the General Formula (27) with acrylonitrile. The reaction is carried out at 20 to 100° C. for 1 to 200 hours.

The compound represented by the General Formula (13) can be produced by reacting a compound represented by the General Formula (27) with a compound represented by the following General Formula (29). $R^{13}$ in the following General Formula (29) is the same as that described above. These compounds are reacted at 20 to 100° C. fro 1 to 200 hours.

Examples of the compounds represented by General Formula (29) include N-phenylmaleimide, N-cyclohexylmaleimide, hydroxyphenylmonomaleimide, N-laulylmaleimide, diethylphenylmonomaleimide, N-(2-chlorophenyl)maleimide, and the like.

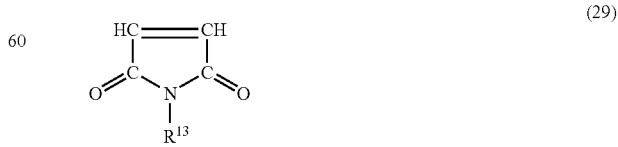

(29)

The compound represented by the General Formula (14) an be produced by reacting a compound represented by the General Formula (27) with a monoisocyanate compound represented by Formula $R^{14}NCO$. $R^{14}$ in the Formula is the same as that described above. The compounds are reacted at 20 to 100° C. for 1 to 200 hours. Examples of the monoisocyanate compounds include ethyl isocyanate, n-hexyl isocyanate, n-decyl isocyanate, p-toluenesulfonyl isocyanate, benzyl isocyanate, 2-methoxyphenyl isocyanate, and the like.

Examples of the compounds represented by the General Formula (15) include γ-aminopropylmethyldimethoxysilane, γ-aminopropylmethyldiethoxysilane, γ-aminopropyltrimethoxysilane, γ-aminopropyltriethoxylsilane, N-phenyl-γ-aminopropyltrimethoxysilane, N-naphthyl-γ-aminopropyltrimethoxysilane, N-(n-butyl)-γ-aminopropyltrimethoxysilane, N-phenyl-γ-aminopropylmethyldimethoxysilane, N-naphthyl-γ-aminopropylmethyldimethoxysilane, N-(n-butyl)-γ-aminopropylmethyldimethoxysilane, N-ethyl-γ-aminoisobutyltrimethoxysilane, N-methyl-γ-aminopropylmethyldimethoxysilane, N-methyl-γ-aminopropyltrimethoxysilane, and the like.

The compounds represented by General Formula (16) and (17) above can be produced by reacting a compound represented by the following General Formula (30) with a compound represented by the General Formula (28), acrylonitrile, a compound represented by the General Formula (29) or a monoisocyanate compound described above. The reaction is carried out at 20 to 100° C. for 1 to 200 hours.

$R^7$, $R^8$, $R^9$, $R^{16}$ and p in General Formula (30) are the same as those described above; and examples of the compounds include N-β(aminoethyl)-γ-aminopropyltrimethoxysilane, N-β(aminoethyl)-γ-aminopropylmethyldimethoxysilane, N-β(aminoethyl)-γ-aminopropyltriethoxylsilane, N-β(aminoethyl)-γ-aminopropylethyldiethoxysilane, γ-aminopropyldimethylmethoxysilane, (aminoethylaminomethyl)phenethyltrimethoxysilane, N-(6-aminohexyl)-3-aminopropyltrimethoxysilane, N-(2-aminoethyl)-11-aminoundecyltrimethoxysilane and the like. These compounds may be used alone or in combination of two or more.

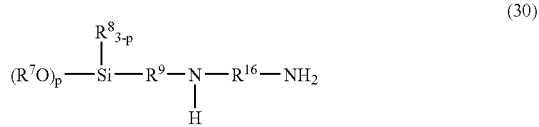

(30)

Examples of the compounds represented by the General Formula (18) include γ-mercaptopropylmethyldimethoxysilane, γ-mercaptopropylmethyldiethoxysilane, γ-mercaptopropyltrimethoxysilane, γ-mercaptopropyltriethoxylsilane, and the like.

An example of the reaction of a monoisocyanate compound having a group represented by General Formula (9) or (10) above and an isocyanate group in the molecule with a compound represented by General Formula (11), (12), (13), (14), (15), (16), (17) or (18) above (substituted urea bond formation) will be described below.

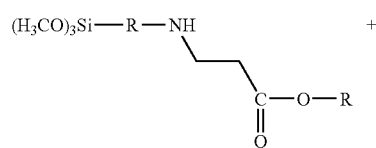

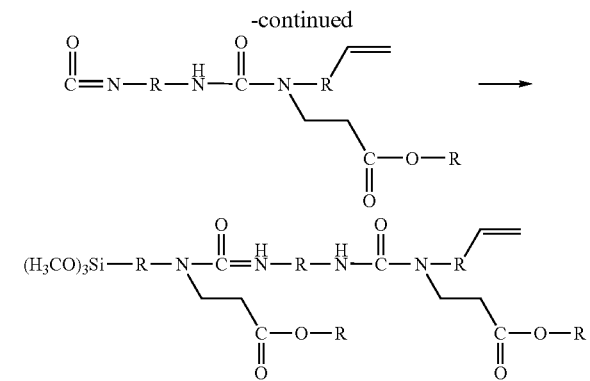

The reaction of the monoisocyanate compound having a group represented by General Formula (9) or (10) above and an isocyanate group in the molecule and the compound represented by the following General Formula (11), (12), (13), (14), (15), (16), (17) or (18) is carried out at 20 to 50° C. for 1 to 200 hours, but may of course be carried out for longer than 200 hours. A polymerization inhibitor may be added as needed then.

(2) Compound (e-2)

Compound having a hydrolysable silicon group-containing unsaturated double bond prepared by reacting a polyvalent (meth)acrylate compound or a polyvalent allyl compound represented by the following General Formula (31) with a compound represented by General Formula (11), (12), (13), (14), (15), (16), (17) or (18) above.

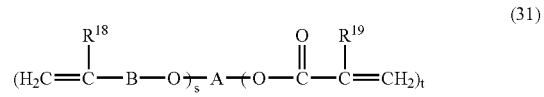

(31)

In the General Formula, A represents a residue of (meth)acrylic or allyl compound having the group represented by the following General Formula (32)(a) at one end of the molecule and the group represented by the following General Formula (32)(b) at the other end of the molecule; B represents —CO— or —CH$_2$—; $R^{18}$ represents a hydrogen atom or a methyl group when B is —CO—, and a hydrogen atom when B is —CH$_2$—; $R^{19}$ represents a hydrogen atom or an alkyl, aryl, or aralkyl group having 1 to 10 carbon atoms; and r and s each represent an integer of 1 to 3

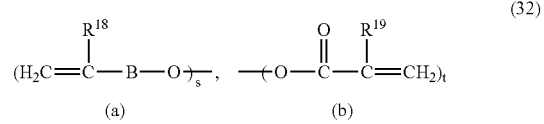

(32)

(a)   (b)

However, $R^{18}$ and $R^{19}$ in General Formula (32) above are the same as those described above.

Examples of the polyvalent (meth)acrylate-based compounds represented by General Formula (31) above include butanediol, hexanediol, ethylene glycol, propylene glycol, diethylene glycol, triethylene glycol, tripropylene glycol, glycerol, neopentylglycol, trimethylolpropane, pentaerythritol, dipentaerythritol, polyacrylates or polymethacrylates of a polyol compound such as polyethylene glycol or polypropylene glycol including ethylene glycol di(meth)acrylate, triethylene glycol di(meth)acrylate, neopentylglycol di(meth)acrylate, trimethylolpropane tri(meth)acrylate, pentaerythritol tri(meth)acrylate, dipentaerythritol hexa(meth)acrylate, and 1,6-hexanediol di(meth)acrylate; and the like. Commercially available products: Epoxy Ester 40EM, 70PA, 200PA, 80MF, 3002M, and 30002A (trade name, manufactured by Kyoei Kagaku Kogyo Co., Ltd.), may be used as the (meth)acrylic acid adducts of the polyol compound polyglycidylether above.

In contrast to the polyvalent (meth)acrylate-based compound, which has (meth)acryloyl groups at least two terminals, the polyvalent allyl compound has a (meth)acryloyl group at one terminal and an allyl group at other terminal. Examples of the compounds include a compound that one terminal end of a (meth)acryloyl group of polyvalent (meth)acrylate exemplified above is replaced with an allyl group.

The reaction of the polyvalent (meth)acrylate-based compound or the polyvalent allyl compound represented by the General Formula (31) with the compound represented by General Formula (11), (12), (13), (14), (15), (16), (17) or (18) above is carried out at 20 to 100° C. for 1 to 200 hours, but may of course be carried out for longer than 200 hours. A polymerization inhibitor may be added as needed then. Examples of the reactions (Michael addition reaction and formation of a Michael addition reaction-derived nitrogen sulfur atom) are described below.

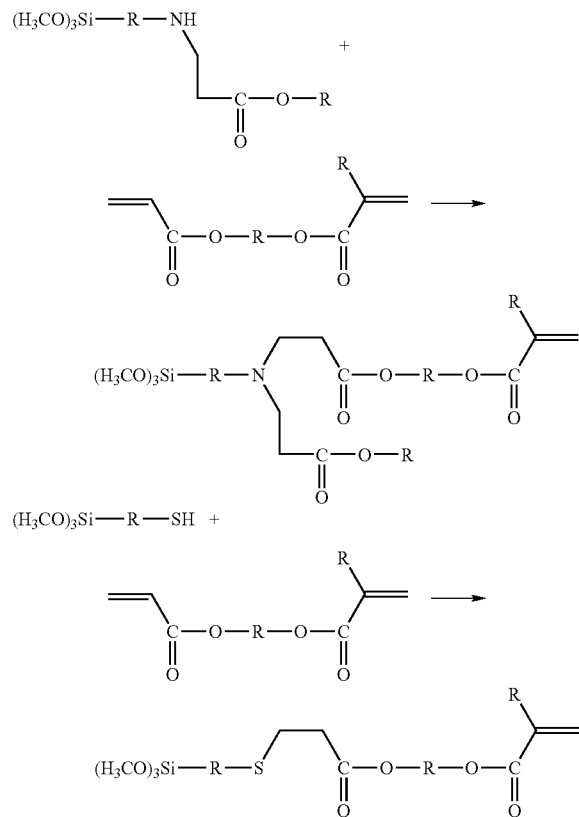

Polymers separately prepared from these compounds (e-1) and (e-2) by polymerization may be added to the polymer prepared from the (meth)acrylic compound by polymerization, but these compounds are particularly preferably copolymerized with the (meth)acrylic compound above. The copolymerization may be performed, for example, between the compound (e-1) and a (meth)acrylic compound, between the compound (e-2) and a (meth)acrylic compound, or between the compounds (e-1) and (e-2) and a (meth)acrylic compound.

The composition 1 according to the invention contains a polymer (C), and the polymer (C) is prepared from one or more polymerizable vinyl monomers, compounds (d), by (co)polymerization. Alternatively, the composition 2 contains a polymer (C) and a polymer of the compound (e) as its components, and the polymer (C) and the polymer of the compound (e) may be simply mixed, or alternatively, prepared from one or more of the compounds (d) and one or more of the compounds (e) by copolymerization. The (co)polymerization of the compounds (d) or of polymerization of the compounds (d) and (e) may be performed by any one of know methods commonly practiced in the art during (co)polymerization of the polymerizable vinyl monomers such as (meth)acrylate compounds, for example by radical polymerization, anionic polymerization, cationic polymerization, or the like. The (co)polymerization is preferably carried out by radical polymerization method, which is performed in the presence of polymerization initiator such as an azo compound [2,2'-azobisisobutylonitrile, 2,2'-azobis(2-methylbutylonitrile), 2,2'-azobis(2,4-dimethyl valeronitrile), 2,2'-azobis(2-methyl-4-trimethoxysilyl pentanonitrile), 2,2'-azobis(2-methyl-4-methyldimethoxysilyl pentanonitrile), or VA-046B, VA-037, VA-061, VA-085, VA-086, VA-096, V-65, or VAm-110 (trade name, manufactured by Wako Pure Chemical Industries)] or a peroxide (benzoylperoxide, t-alkylperoxyester, acetyl peroxide, diisopropylperoxy carbonate, or the like). The polymerization may be carried out in the presence of a chain transfer agent such as laurylmercaptan, γ-mercaptopropyltrimethoxysilane, γ-mercaptopropylmethyldimethoxysilane, thio-β-naphthol, thiophenol, n-butylmercaptan, ethyl thioglycolate, isopropylmercaptan, t-butylmercaptan, γ-trimethoxysilylpropyldisulfide, or the like. The polymerization reaction is preferably performed at 20 to 200° C., particularly preferably 50 to 150° C., for several to several tens of hours. The polymerization may also be carried out in the presence of a solvent such as xylene, toluene, acetone, methylethylketone, ethyl acetate, butyl acetate, or the like.

The (co)polymerization of the compounds (d) and the (co)polymerization of the compounds (d) and (e) is particularly favorably conducted in the curable resin above, for increasing the advantageous effects of the present invention. The composition 1 according to the invention contains 100 parts by weight of the curable resin and 5 to 1,000 parts, preferably 10 to 100 parts, by weight of the polymer (C) prepared by polymerization of the compound (d). A content of the polymer (c) of less than 5 parts by weight may cause a problem of insufficient reinforcement by addition of the polymer (C), while a content of more than 1,000 parts by weight, of excessively high viscosity of the composition 1. The composition 2 according to the invention contains, in addition to the composition 1, the polymer of the compound (e) in an amount of 1 to 50 wt %, preferably 5 to 30 wt %, with respect to the total amount of the polymer (C) and the polymer of the compound (e). If the content of polymer formed from a compound (e) is less than 1 wt %, it is not effective in exhibiting the reinforcement effect by addition of the compound (e) polymer, while a content of more than 50 wt % causes a problem of excessively high viscosity of the composition 2.

The composition 3 according to the invention contains the curable resin described above and a curing catalyst for the curable resin (hereinafter, referred to as compound (f)). Addition of the compound (f) to the curable resin allows hardening of the curable resin and makes the composition 3 function as an adhesive, sealer, or the like.

Examples of the curing catalyst compounds (f) include basic substances such as organic tin compounds, metal complexes, amines; organic phosphoric acid compounds, water (moisture in air) and Lewis acids, and the like.

Examples of the organic tin compounds include dibutyltin dilaurate, dioctyltin dimalate, dibutyltin phthalate, stannous octoate, dibutyltin methoxide, dibutyltin diacetylacetate, dibutyltin diversatate, reaction products from dibutyltin oxide and aphthalic diester, dibutyltin oxide, dibutyltin distearate, dibutyltin dioctoate, dibutyltin dioleylmalate, dibutyltin dioctylthioglycolate, dibutyltin laurate oxide, dibutyltin diacetate, dibutyltin monoacetate, dibutyltin monoacetate, dibutyltin dimercaptopropionic acid octyl ester, dibutyltin monomalate, dibutyltin dimalate, stannous octoate, tin neodecanoate, tin stearate, and the like; as well as SCAT-46A, SCAT-4A, SCAT-9, SCAT-24, SCAT-52, SCAT-8, SCAT-8B, SCAT-1, SCAT-2L, SCAT-7, SCAT-27, SCAT-31A, SCAT-32A, and STANN JF-9B (tradename, manufactured by Sankyo Organic Chemicals Co., Ltd.), U-130, U-22, U-280, U-340, U-350, U-360, U-370, U-373, U-810, U-840, U-850, U-860, and U-870 (tradename, manufactured by Nitto Kasei Co., Ltd.), and the like.

In addition to the compounds above, the organic tin compounds include the following poly(dialkylstannoxane) dicarboxylates represented by General Formula 33.

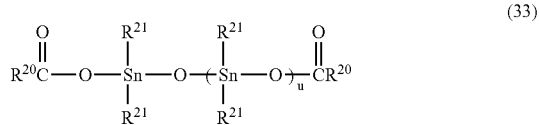

(33)

In the General Formula (33), $R^{20}$ and $R^{21}$ each represent a substituted or unsubstituted hydrocarbon group having 1 to 12 carbon atoms; u is an integer of 1 or more; and $R^{20}$ and $R^{21}$ may be the same as or different from each other.

Examples of the substituted or unsubstituted hydrocarbon groups having 1 to 12 carbon atoms represented by $R^{20}$ and $R^{21}$ include straight- or branched straight-chain alkyl groups such as methyl, ethyl, propyl, isopropyl, butyl, isobutyl, s-butyl, t-butyl, pentyl, hexyl, heptyl, octyl, 2-ethylhexyl, decyl, and lauryl; substituted or unsubstituted phenyl groups; and the like. u is an integer of 1 or more and preferably an integer of 1 to 3. $R^{20}$ and $R^{21}$ may be the same as or different from each other.

Examples of the poly(dialkylstannoxane) dicarboxylates represented by General Formula (33) include tetraalkyldistannoxane dicarboxylates such as 1,1,3,3-tetramethyl-1,3-bis(acetoxy)distannoxane, 1,1,3,3-tetramethyl-1,3-bis(butyryloxy)distannoxane, 1,1,3,3-tetramethyl-1,3-bis(octanoyloxy)distannoxane, 1,1,3,3-tetramethyl-1,3-bis(2-ethylhaxanoyloxy)distannoxane, 1,1,3,3-tetramethyl-1,3-bis(lauroyloxy)distannoxane, 1,1,3,3-tetrabutyl-1,3-bis(acetoxy)distannoxane, 1,1,3,3-tetrabutyl-1,3-bis(butyryloxy)distannoxane, 1,1,3,3-tetrabutyl-1,3-bis(octanoyloxy)distannoxane, 1,1,3,3-tetrabutyl-1,3-bis(2-ethylhaxanoyloxy)distannoxane, 1,1,3,3-tetrabutyl-1,3-bis(lauroyloxy)distannoxane, 1,1,3,3-tetraoctyl-1,3-bis(acetoxy)distannoxane, 1,1,3,3-tetraoctyl-1,3-bis(butyryloxy)distannoxane, 1,1,3,3-tetraoctyl-1,3-bis(octanoyloxy)distannoxane, 1,1,3,3-tetraoctyl-1,3-bis(2-ethylhaxanoyloxy)distannoxane, 1,1,3,3-tetraoctyl-1,3-bis(lauroyloxy)distannoxane, 1,1,3,3-tetralauryl-1,3-bis(acetoxy)distannoxane, 1,1,3,3-tetralauryl-1,3-bis(butyryloxy)distannoxane, 1,1,3,3-tetralauryl-1,3-bis(octanoyloxy)distannoxane, 1,1,3,3-tetralauryl-1,3-bis(2-ethylhaxanoyloxy)distannoxane, and 1,1,3,3-tetralauryl-1,3-bis(lauroyloxy)distannoxane; hexaalkyltristannoxane dicarboxylates such as 1,1,3,3,5,5-hexamethyl-1,5-bis(acetoxy)tristannoxane, 1,1,3,3,5,5-hexamethyl-1,5-bis(butyryloxy)tristannoxane, 1,1,3,3,5,5-hexamethyl-1,5-bis(octanoyloxy)tristannoxane, 1,1,3,3,5,5-hexamethyl-1,5-bis(2-ethylhaxanoyloxy)tristannoxane, 1,1,3,3,5,5-hexamethyl-1,5-bis(lauroyloxy)tristannoxane, 1,1,3,3,5,5-hexabutyl-1,5-bis(acetoxy)tristannoxane, 1,1,3,3,5,5-hexabutyl-1,5-bis(butyryloxy)tristannoxane, 1,1,3,3,5,5-hexabutyl-1,5-bis(octanoyloxy)tristannoxane, 1,1,3,3,5,5-hexabutyl-1,5-bis(2-ethylhaxanoyloxy)tristannoxane, 1,1,3,3,5,5-hexabutyl-1,5-bis(lauroyloxy)tristannoxane, 1,1,3,3,5,5-hexalauryl-1,5-bis(acetoxy)tristannoxane, 1,1,3,3,5,5-hexalauryl-1,5-bis(butyryloxy)tristannoxane, 1,1,3,3,5,5-hexalauryl-1,5-bis(octanoyloxy)tristannoxane, 1,1,3,3,5,5-hexalauryl-1,5-bis(2-ethylhaxanoyloxy)tristannoxane, and 1,1,3,3,5,5-hexalauryl-1,5-bis(lauroyloxy)tristannoxane; and the like.

In addition, a reaction product of the silicate compound represented by the following General Formula (34) may be used as the poly(dialkylstannoxane) dicarboxylate represented by General Formula (33).

$$R^{22}{}_{v}Si(OR^{23})_{4-v} \qquad (34)$$

In General Formula (34), $R^{22}$ and $R^{23}$ each represent an alkyl group having 1 to 4 carbon atoms; v is an integer of 0 to 3; and $R^{22}$ and $R^{23}$ may be the same as or different from each other if both are present, and $R^{22}$s and $R^{23}$s may be the same as or different from each other if plurality of $R^{22}$s and $R^{23}$s are present. In the Formula, the alkyl group having 1 to 4 carbon atoms represented by $R^{22}$ and $R^{23}$ is methyl, ethyl, propyl, isopropyl, butyl, isobutyl, s-butyl, or t-butyl.

Examples of the silicate compounds represented by General Formula (34) include tetraalkoxysilanes such as tetramethoxysilane, tetraethoxysilane, tetrapropoxysilane, tetraisopropoxysilane, and tetrabutoxysilane; trialkoxymonoalkylsilanes such as triethoxylmethylsilane, triethoxylethylsilane, triethoxylpropylsilane, triethoxyisopropylsilane, and triethoxylbutylsilane; dialkoxydialkylsilanes such as diethoxydimethylsilane, diethoxydiethylsilane, diethoxydipropylsilane, diethoxydiisopropylsilane, and diethoxydibutylsilane; monoalkoxytrialkylsilanes such as ethoxytrimethylsilane, ethoxytriethylsilane, ethoxytripropylsilane, ethoxytriisopropylsilane, and ethoxytributylsilane; and the like. Hydrolysates of these alkoxysilanes may also be used similarly to these alkoxysilanes.

Poly(dialkylstannoxane) disilicate compounds, reaction products between a poly(dialkylstannoxane) dicarboxylate represented by General Formula (33) and a silicate compound represented by General Formula (34) and/or the hydrolysate thereof, can be produced by allowing these compounds to react at 100 to 130° C. for approximately 1 to 3 hours and removing the carboxylate ester generated under reduced pressure. As for the ratio of the compounds, the alkoxy group is preferably added in an amount of one equivalence or more with respect to one equivalence of the carboxyl group, for complete elimination of the carboxyl group. If carboxyl groups remain, it may lead to decrease in catalytic activity. The reaction may be carried out in the presence or absence of a solvent, but is preferably performed in the absence of a solvent. Examples of the poly(dialkylstannoxane) disilicate, i.e., reaction products of a poly(dialkylstannoxane) dicarboxylate represented by General Formula (33) and a silicate compound represented by General Formula (34) and/or the hydrolysate thereof, include the compounds represented by the following General Formula (35).

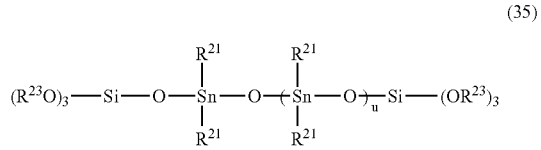

In General Formula (35), $R^{21}$ and $R^{23}$ and u are the same as those described above.

Examples of the metal complexes include titanate compounds such as tetrabutyl titanate, tetraisopropyl titanate, and triethanolamine titanate; carboxylic acid metal salts such as lead octanoate, lead naphthenate, nickel naphthenate, and cobalt naphthenate; metal acetylacetonate complexes such as aluminum acetylacetonate complex and vanadium acetylacetonate complex; and the like. Also included are U-600 and U-660 (trade name, manufactured by Nitto Kasei Co., Ltd.), and the like.

Examples of the bases include aminosilanes such as γ-aminopropyltrimethoxysilane and γ-aminopropyltriethoxysilane; quaternary ammonium salts such as tetramethylammonium chloride and benzalkonium chloride; straight-chain or cyclic tertiary amines and quaternary ammonium salts containing multiple nitrogen atoms such as DABCO (registered trademark), DABCO BL series products manufactured by Sankyo Air Products; and the like.

Examples of the organic phosphoric acid compounds include monomethyl phosphate, di-n-butyl phosphate, triphenyl phosphate, and the like.

Examples of the Lewis acids include $BF_3$, $FeCl_3$, $SnCl_4$, $AlCl_3$, $ZnCl_2$, $CuCl_2$, $ZnCl_4$, and the like; and complexes of these Lewis acids, for example, amine complexes, alcohol complexes, and ether complexes, are usable. Examples of the amine compounds for use in the amine complexes include ammonia, monoethylamine, triethylamine, pyridine, aniline, morpholine, cyclohexylamine, n-butylamine, monoethanolamine, diethanolamine, triethanolamine, and the like; examples of the alcohol compounds for use in the alcohol complexes include primary alcohols such as methanol, ethanol, propanol and n-butanol, secondary alcohols such as isopropanol and 2-butanol, and the like; examples of the ether compounds for use in the ether complexes include dimethylether, diethylether, di-n-butylether, and the like. Among the Lewis acids and the complexes thereof, $BF_3$ complexes are particularly preferable, because of the convenience in handling and others. The Lewis acids and the complexes thereof may be used alone or in combination of two or more.

The composition 3 contains the curable resin and a compound (f), and as for the blending rate of the curable resin to the compound (f), the compound (f) is in an amount of preferably 0.01 to 20 parts by weight, particularly preferably 0.02 to 10 parts by weight, with respect to 100 parts by weight of the curable resin.

The composition 4 according to the invention contains the composition 1 or 2 and a curing catalyst for the curing resin. It is possible to harden the composition 1 or 2 by blending a curing catalyst for curing resin with the composition 1. The curing catalyst for curing resin is one or more compounds selected from the compounds (f) used in the composition 3. The composition 4 contains the composition 1 or 2 and a compound (f), and, as for the blending rate of the composition 1 or 2 to the compound (f), the compound (f) is preferably in an amount of preferably 0.01 to 20 parts by weight, particularly preferably 0.02 to 10 parts by weight, with respect to 100 parts by weight of the curing resin in the composition 1 or 2.

The compositions 3 and 4 according to the invention contain the curing resin, the composition 1 or 2, and the component above; and the curing resin, the composition 1 or 2, and the compositions 3 and 4 may contain additionally an epoxy resin and a ketimine compound, a tackifier resin, one or more fine powder selected from silica fine powder and organic polymer fine powder, or an alkoxypolysiloxane.

Examples of the epoxy resins include bisphenol A epoxy resin, bisphenol F epoxy resin, novolak epoxy resin, amine-glycidylated epoxy resin, heterocyclic ring-containing epoxy resin, alicyclic epoxy resin, hydrogenated bisphenol A epoxy resin, urethane-modified epoxy resin, hydantoin epoxy resin, and the like; and these epoxy resins may be used alone or in combination of two or more.

The ketimine compound (hereinafter, referred to as compound (g)) is a compound having the group represented by General Formula —N=C(X)(Y) (wherein, X represents a hydrogen atom or an organic group, and Y represents an organic group.); and in the invention, for example, the following compounds (1) and (2) are used effectively.

(1) Compounds represented by the following General Formula (36) and the derivatives thereof: for example, compounds prepared by reacting an epoxy group-containing compound with the imino group of the compound.

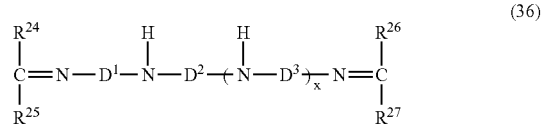

In the Formula above, $R^{24}$, $R^2$, $R^{26}$ and $R^{27}$ each represent a hydrogen atom, an alkyl group having 1 to 6 carbon atoms, a phenyl group, or a phenyl group having an alkyl group having 1 to 6 carbon atoms, and the groups may be the same as or different from each other; $D^1$, $D^2$ and $D^3$ are respectively alkylene groups having 2 to 6 carbon atoms that may be the same as or different from each other; and x is 0 or 1.

Examples of the compounds represented by General Formula (36) include 2,5,8-triaza-1,8-nonadiene, 2,10-dimethyl-3,6,9-triaza-2,9-undecadiene, 2,10-diphenyl-3,5,9-triaza-2,9-undecadiene, 3,11-dimethyl-4,7,10-triaza-3,10-tridecadiene, 3,11-diethyl-4,7,10-triaza-3,10-tridecadiene, 2,4,12,14-tetramethyl-5,8,11-triaza-4,11-pentadecadiene, 2,4,20,22-tetramethyl-5,12,19-triaza-4,19-trieicosadiene, 2,4,15,17-tetramethyl-5,8,11,14-tetraaza-4,14-octadecadiene, and the like.

Examples of the epoxy group-containing compounds that are reacted with the imino group of the compound represented by General Formula (36) include styrene oxide, butylglycidylether, allylglycidylether, p-ter-butylphenylglycidylether, p-sec-butylphenylglycidyletheru, m-p-cresylglycidylether, p-cresylglycidylether, vinylcyclohexane dioxide, versatic glycidylester, cardanol-modified glycidylether, dimer acid glycidylester, 1,6-hexanediol diglycidylether, resorcinoglycidylether, propylene glycol diglycidylether, 1,4-butanediol diglycidylether, neopentylglycol diglycidylether, and the like. In particular, styrene oxide derivatives are preferable. The ketimine derivative may be a compound prepared by reacting an epoxy group-containing compound with one of the two imino groups of the compound represented by the structural Formula above.

The compounds (1) also include the compounds represented by the following General Formula (37) and (38). In General Formula (37), n represents a number of 1 to 6. In General Formula (38), x, y, and z may be the same as or different from each other. The total of x+y+z is approximately 5.3.

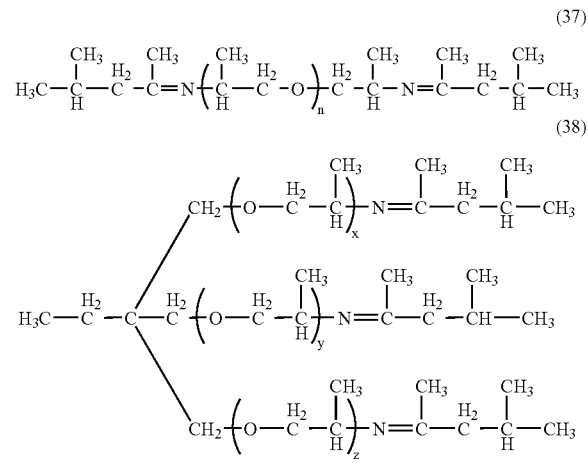

(2) Compounds Prepared by Reacting an Amine Compound Having at Least One Primary Amino Group in the Molecule with a Carbonyl Compound The amine compound having at least one primary amino group in the molecule has generally a primary amino-group equivalence of about 2,000 or less, preferably in the range of about 30 to 1,000, and generally a number average molecular weight of approximately 5,000 or less, preferably in the range of about 60 to 3,000.

Examples of the amine compounds include aliphatic, aromatic, and alicyclic polyamines, more specifically, ethylenediamine, propylenediamine, butylenediamine, diethylenetriamine, triethylenetetramine, tetraethylenepentamine, pentaethylenehexamine, hexamethylenediamine, trimethylhexamethylenediamine, N-aminoethylpiperazine, 1,2-diaminopropane, iminobispropylamine, methyliminobispropylamine, polyamines having a polyoxyalkylene skeleton such as poly(oxypropylene)diamine, diamines having a polyether skeleton such as Jeffermine EDR148 (trade name, manufactured by Santechno Chemicals Co., Ltd.), isophoronediamine, 1,3-bis aminomethylcyclohexane, 1-cyclohexylamino-3-aminopropane, 3-aminomethyl-3,3,5-trimethylcyclohexylamine, diamines having a norbornane skeleton such as NBDA (trade name, manufactured by Mitsui Chemicals), diamines having a xylylene skeleton such as m-xylylenediamine MXDA (trade name, manufactured by Mitsubishi Gas Chemical Company), diaminodiphenylmethane, phenylenediamine, and polyamide amines having primary amino groups at the ends of the polyamide molecule.

In addition, also included are silicon atom-containing amine compounds such as N-β(aminoethyl)-γ-aminopropyltrimethoxysilane, N-β(aminoethyl)-γ-aminopropylmethyldimethoxysilane, γ-aminopropyltrimethoxysilane, and γ-aminopropyltriethoxylsilane; and among the amine compounds above, polyamine compounds having two or more primary amino groups in the molecule are particularly preferable.

Examples of the carbonyl compounds include ketones such as acetone, methylethylketone, methylisopropylketone, methylisobutylketone, methyl-t-butylketone, diethylketone, dipropylketone, diisobutylketone, ethylpropylketone, ethylbutylketone, cyclohaxanone, propiophenone, and benzophenone; and aldehydes such as acetaldehyde and benzaldehyde.

The ketimines are prepared by blocking the amine compound above with the ketone, and the aldimines are prepared by blockng with the aldehyde. The compounds (2) (compound (g)) include both the ketimines and the aldimines. The reaction of the amine compound with the carbonyl compound may be performed according any one of known methods under the blending ratio and condition that substantially all primary amino groups present in the amine compound react with the carbonyl compound. The reaction of these compounds is performed in the absence of a solvent or in the presence of a non-polar solvent such as hexane, cyclohexane, toluene, or benzene under heat and reflux, while water generated is removed by azeotropic distillation. A ketone less soluble in water and smaller in steric hindrance such as methylisobutylketone or methylethylketone may be used as the carbonyl compound, for facilitating the reaction (dehydration reaction). The epoxy resin and the ketimine compound are respectively used in amounts of 1 to 100 parts and 1 to 100 parts by weight with respect to 100 parts by weight in the curable resin or the composition 1.

Each of the compositions according to the invention contains the respective components above, and may be used in various applications such as paint, adhesive, sealant, molding material, and coating agent; and when used in such applications, each composition may contain, in addition to the components, a tackifier resin, one or more fine powders selected from silica and organic polymer fine powders, or an alkoxypolysiloxane.

The tackifier resin is not particularly limited, and a commonly used resin, whether it is solid or liquid at room temperature, may be used. Typical examples thereof include phenol resins, modified phenol resins (for example, cashew oil-modified phenol resin, tall oil-modified phenol resin, etc.), terpene phenol resins, xylene-phenol resins, cyclopentadiene-phenol resins, coumaroneindene resins, rosin resins, rosin ester resins, hydrogenated rosin ester resins, xylene resins, low-molecular weight polystyrene resins, styrene copolymer resins, petroleum resins (for example, $C_5$ hydrocarbon resin, $C_9$ hydrocarbon resin, $C_5$-$C_9$ hydrocarbon copolymerization resin, etc.), hydrogenated petroleum resins, terpene resins, DCPD resins, and the like. These resins may be used alone or in combination of two or more. Among the tackifier resins, terpene phenol resins, rosin ester resins, hydrogenated rosin ester resins, xylene resins, styrene copolymer resins, $C_9$ hydrocarbon resins, hydrogenated petroleum resins, and terpene resins are preferable, as they are superior in compatibility and tackiness. The tackifier resin is preferably blended in an amount of 5 to 70 parts by weight with respect to 100 parts by weight of the curable resin.

The one or more fine powder selected from silica fine powder and organic polymer fine powder preferably has a particle diameter of 10 nm to 300 μm, preferably 100 nm to 100 μm, and particularly preferably 1 to 30 μm.

Any silica fine powder may be used if the particle diameter is in the range above, and hydrophobic silica fine powder is preferable. For example, silica fine powders such as fumed silica and silica aerogel, which are widely used as a thixotropic agent for adhesives and others, that are treated with an organic silicon compound such as dimethyldichlorosilane, hexamethyldisilazane, dimethylsiloxane, or trimethoxyoctylsilane may be used as the hydrophobic silica fine powder, and in particular, fumed silica treated with hexamethyldisilazane and silica aerogel treated with dimethylsiloxane and/or hexamethyldisilazane are preferable.

The hydrophobilization is performed by agitating silica fine powder with the organic silicon compound above at a temperature of approximately 100 to 400° C. at high speed. The agitation is preferably performed in a medium such as an organic solvent to make the contact thereof more uniform. As for the ratio of the silica fine powder to the organic silicon compound during the contact, the organic silicon compound is used in an amount of 3 to 40 parts by weight with respect to 100 parts by weight of the silica fine powder.

Examples of the organic polymer fine powders include urethane resin fine powder, polyester fine powder, polycarbonate fine powder, polymethylsilsesquioxane fine powder, acrylic resin fine powder, vinyl resin fine powders such as styrene resin fine powder and polyvinyl chloride, polyolefinic fine powders of polyethylene and polypropylene, silicone elastomer fine powder, and the like. These organic polymer fine powders may be used alone or in combination of two or more.

Alternatively, amorphous high-purity molten quartz glass fine powder may also be used. The high-purity molten quartz glass fine powder preferably has a $SiO_2$ content of 99.8 wt % or more and is extremely free from impurities such as alkali metals and others, and the particle diameter is more preferably 1 to 100 μm and particularly preferably 2 to 50 μm.

The amorphous high-purity molten quartz glass fine powder may be used as it is, or after surface treatment with a coupling agent. Examples of the coupling agents include organic titanate compounds, organic aluminum compounds, organic zirconium compounds, alkoxysilanes, and the like. Typical examples of the organic titanate compounds include tetrapropoxytitanium, tetrabutoxytitanium, tetrakis(2-ethylhexyloxy)titanium, tetrastearyloxytitanium, dipropoxy-bis(acetylacetonato)titanium, titanium propoxyoctylene glycolate, titanium stearate, isopropyltriisostearoyltitanate, isopropyltridodecyl benzenesulfonyltitanate, isopropyl tris (dioctylpyrophosphato)titanate, tetraisopropyl bis(dioctylphosphito)titanate, tetraoctyl bis(ditridodecylphosphito) titanate, tetra(2,2-diallyloxymethyl-1-butyl) bis (ditridodecyl)phosphitotitanate, bis(dioctyl pyrophosphate) oxyacetatotitanate, tris(dioctylpyrophosphato)ethylene titanate, and the like. Examples of the organic aluminum compounds include acetalkoxyaluminum diisopropylate; and examples of the organic zirconium compounds include zirconium butyrate, zirconium acetylacetonate, acetylacetone zirconium butyrate, zirconium lactate, zirconium stearate butyrate, and the like. Examples of the alkoxysilanes include vinyltrimethoxysilane, vinyltriethoxylsilane, bistris (β-methoxyethoxy) silane, N-(β-aminoethyl)-γ-aminopropylmethyldimethoxysilane, N-(β-aminoethyl)-γ-aminopropyltrimethoxysilane, γ-aminopropyltrimethoxysilane, γ-aminopropyltriethoxylsilane, γ-glycidoxypropyltrimethoxysilane, γ-glycidoxypropylmethyldimethoxysilane, β-(γ, δ-epoxycyclohexyl)ethyltrimethoxysilane, γ-chloropropyltrimethoxysilane, γ-chloropropylmethyldimethoxysilane, γ-methacryloxypropyltrimethoxysilane, γ-mercaptopropyltrimethoxysilane, hexamethyldisilazane, and the like.

The one or more fine powders selected from the silica fine powders and the organic polymer fine powders above are contained in an amount of 1 to 50 parts by weight with respect to 100 parts by weight of the curable resin. If an amorphous high-purity molten quartz glass fine powder is used, the blending rate of the glass fine powder is preferably 1 to 300 parts by weight with respect to 100 parts by weight of the curable resin.

Commercially alkoxypolysiloxane products are available and may be used. Examples thereof include KC-89S, KR-500, X-40-9225, X-40-9246, X-40-9250, KR-217, KR-510, X-40-9227, X-41-1053, X-41-1056, X-41-1805, X-41-1810, X-41-2651, X-40-2308, and X-40-9238 (trade name, manufactured by Shin-Etsu Chemical), the alkoxypolysiloxanes containing an alkoxy group disclosed in JP-A No. 2003-221514 and others, and the like. The alkoxypolysiloxane is preferably contained in an amount of 1 to 70 parts by weight with respect to 100 parts by weight of the curable resin.

In the invention, the composition may contain a mixture (I) comprising the curable resin and an epoxy resin hardener, and a mixture (II) comprising an epoxy resin and a hardening catalyst for the curable resin. The composition preferably comprises 15 to 80% by weight of the mixture (I) and 85 to 15% by weight of the mixture (II), the mixture (I) comprises 100 parts by weight of the curable resin and 0.01 to 80 parts by weight of the epoxy resin hardener, the mixture (II) comprises 100 parts by weight of epoxy resin and 0.1 to 20 parts by weight of a hardening catalyst of the curable resin. In addition, the composition may contain a mixture (I) comprising the composition 1 or 2 and an epoxy resin hardener, and a mixture (II) comprising an epoxy resin and a hardening catalyst for the curable resin. As for the blending rat io of respective components in the composition, the epoxy resin hardener is used in an amount of 0.01 to 80 parts by weight with respect to 100 parts by weight of the curable resin in the composition 1 or 2 in the mixture (I) and the curable resin-curing catalyst is used in an amount of 0.1 to 20 parts by weight with respect 100 parts by weight of the epoxy resin in the mixture (II); and the ratio of the mixtures. (I) to (II) is preferably 15-80 wt % to 85-15 wt %.

Examples of the epoxy resin hardeners include ethylenediamine, 1,3-propanediamine, hexamethylenediamine, diethylenetriamine, triethylenetetramine, 2,2,4-trimethyl-1, 6-hexanediamine, m-xylylenediamine, bis(4-aminocyclohexyl)propane, isophoronediamine, tetraethylenepentamine, dipropylenetriamine, bishexamethylenetriamine, 1,3,6-trisaminomethylhexane, trimethylhexamethylenediamine, polyetherdiamine, diethylaminopropylamine, menthenediamine, bis(4-amino-3-methylcyclohexyl)methane, N-aminoethylpiperazine, m-phenylenediamine, diaminodiphenylsulfone, diaminodiphenylmethane, and the modified compounds thereof. The modification methods include, for example, epoxy compound addition, ethylene oxide addition, propylene oxide addition, acrylonitrile addition, Mannich addition of phenol or the derivatives thereof and formalin, thiourea addition, ketone blocking, and the like.

Other examples of the hardeners include phenolic novolaks, polymercaptan compounds, polysulfides, ketimines, tertiary amines, organic acid hydrazides, dicyandiamides and the derivatives thereof, amine imides, carboxylic esters, boron trifluoride-amine complexes, imidazoles, acid anhydrides, acid halide anhydrides, aromatic diazonium salts, diallyliodonium salts, triallylsulfonium salts, triallylselenium salts, polyamide amines, polyphenols, alcohols, acetylacetonatometal salts, phosphines, and the like; and these hardeners may be used alone or in combination of two or more. The curable resin-curing catalyst is, for example, one or more compounds selected from the compounds (f) above. The epoxy resin may be selected from the compounds described above.

Each of the compositions according to the invention may contain additionally as needed a filler, a plasticizer, various additives, a solvent, a dehydrating agent, a diluent, or the like.

Examples of the fillers include fumed silica, calcium carbonate, magnesium carbonate, clay, talc, silica, various balloons, metal hydroxides such as aluminum hydroxide and magnesium hydroxide, fibrillated fibers, and the like.

Examples of the fibrillated fibers include fibrillated fibers of aromatic polyamide fiber, polyester fiber, polyolefin fiber, polyacrylonitrile fiber, and the like, and the average fiber length is preferably, approximately 0.1 to 5 mm. In addition, roughly fibrillated fiber lower in fibrillation degree than the fibrillated fiber may be used in combination with fibrillated fiber. The term "roughly fibrillated" means that the stem fiber has a smaller number of whisker-like branches per unit length. Examples of the roughly fibrillated fibers include fibrillated or non-fibrillated fibers of polyester fiber, polyolefin fiber, polyacrylonitrile fiber, and the like, Sepiolite, glass fiber, carbon fiber and the like.

Examples of the plasticizers for use include phthalic esters such as dioctyl phthalate and dibutyl phthalate; fatty carboxylic acid esters such as dioctyl adipate and dibutyl sebacate; and the like.

Examples of the various additives include aging inhibitor, thixotropic agent, ultraviolet absorbent, pigment, silane-coupling agent, titanate coupling, thixotropic agent, oligomer, process oil, and the like.

The aging inhibitors are compounds having a secondary amino, hydroxyl, carboxyl, mercapto group and/or a primary amino group in the molecule, which are used widely as a deterioration inhibitor for various resins.

An example of the aging inhibitor having a primary amino group is triacetone diamine. Examples of the compounds having a secondary amino group in the molecule include poly[(6-morpholino-s-triazine-2,4-diyl){2,2,6,6-tetramethyl-4-piperidyl}imino]hexamethylene{2,2,6,6-tetramethyl-4-piperidyl}imino]], bis(2,2,6,6-tetramethyl-4-piperidyl) sebacate, bis(1,2,2,6,6-pentamethyl-4-piperidyl) sebacate, 4-benzoyloxy-2,2,6,6-tetramethylpiperidine, poly(2,2,4-trimethyl-1,2-dihydroquinoline), 6-ethoxy-2,2,4-trimethyl-1,2-dihydroquinoline, N,N'-diphenyl-p-phenylenediamine, N-isopropyl-N'-phenyl-p-phenylenediamine, N-1,3-dimethylbutyl-N'-phenyl-p-phenylenediamine, mixed N,N'-diallyl-p-phenylenediamines, alkylated diphenylamines, 8-acetyl-3-dodecyl-7,7,9,9-tetramethyl-1,3,8-triazaspiro[4.5]decane-2,4-dione, poly[{6-(1,1,3,3-tetramethylbutyl)amino-1,3,5-triazine-2,4-diyl}{2,2,6,6-tetramethyl-4-piperidyl}imino] hexamethylene{2,2,6,6-tetramethyl-4-piperidyl}imino]], N,N'-bis(3-aminopropyl)ethylenediamine-2-bis[N-butyl-N-(1,2,2,6,6-pentamethyl-4-piperidyl)amino]-6-chloro-1,3,5-triazine condensate, diphenylguanidine, di-o-tolylguanidine, N-cyclohexylbenzothiazyl-sulfenamide, and the like.

Examples of the compounds having a hydroxyl group in the molecule include 2,2'-dihydroxy-4-methoxybenzophenone, 2-hydroxy-4-n-octyloxybenzophenone, 2-hydroxy-4-methoxybenzophenone, 2-hydroxy-4-methoxybenzophenohe trihydrate, 2,4-dihydroxybenzophenone, 2-hydroxy-4-methoxybenzophenone-5-sulfuric acid trihydrate, 4-dodecyloxy-2-hydroxybenzophenone, 4-benzyloxy-2-hydroxybenzophenone, 2,2',4,4'-tetrahydroxybenzophenone, 2,2'-dihydroxy-4,4'-dimethoxybenzophenone, 2-hydroxy-4-octoxybenzophenone, 2-hydroxy-4-octoxybenzophenone, 2-(2'-hydroxy-5'-t-octylphenyl)benzotriazole, 2-(2'-hydroxy-5'-methylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-di-t-amylphenyl)-5-chlorobenzotriazole, 2-(2'-hydroxy-3',5'-t-butylphenyl)benzotriazole, 2-(2-hydroxy-4-octyloxyphenyl)-2H-benzotriazole, 2-(2-hydroxy-5-methylphenyl)-2H-benzotriazole, 5-chloro-2-(3,5-di-t-butyl-2-hydroxyphenyl)-2H-benzotriazole, 2-(3-t-butyl-2-hydroxy-5-methylphenyl)-5-chloro-2H-benzotriazole, 2-(3,5-di-t-pentyl-2-hydroxyphenyl)-2H-benzotriazole, 2-(3,5-di-t-butyl-2-hydroxyphenyl)-2H-benzotriazole, 2-(2-hydroxy-5-t-octylphenyl)-2H-benzotriazole, 2-[2'-hydroxy-3'-(3"1,4",5",6"-tetrahydrophthalimide-methyl) -5'-methylphenyl]benzotriazole, 2-(2'-hydroxy-3',5'-di-t-amylphenyl)benzotriazole, 2-(2-hydroxy-3-dodecyl-5-methylphenyl)benzotriazole, 2-[2-hydroxy-3,5-bis(a,a-dimethylbenzyl)phenyl]-2H-benzotriazole, n-hexadecyl 3,5-di-t-butyl-4-hydroxybenzoate, n-hexadecyl 3,5-di-t-butyl-4-hydroxybenzoate, 2',4'-di-t-butylphenyl 3,5-di-t-butyl-4-hydroxybenzoate, 1,3,5-tris(4-t-butyl-3-hydroxy-2,6-dimethylbenzyl) isocyanurate, tris(3,5-di-t-butyl-4-hydroxybenzyl) isocyanurate, 1,3,5-tris(3,5-di-t-butyl-4-hydroxybenzyl) isocyanurate, ethylene glycol bis[3-(3-t-butyl-4-hydroxy-5-methylphenyl)propionate], tetrakis [methylene-3-(3',5'-di-t-butyl-4'-hydroxyphenyl) propionato]methane, n-octadecyl 3-(3',5'-di-t-butyl-4'-hydroxyphenyl)propionate, triethylene glycol, bis[3-(3-t-butyl-4-hydroxy-5-methylphenyl)propionate], isooctyl 3-(3,5-di-t-butyl-4-hydroxyphenyl)propionate, 1,6-hexanediol bis[3-(3,5-di-t-butyl-4-hydroxyphenyl)propionate], 2,2-thio-diethylene bis[3-(3,5-di-t-butyl-4-hydroxyphenyl)propionate], 4,4'-butylidene-bis(3-methyl-6-t-butylphenol), 2,2'-butylidene-bis(4-methyl-6-t-butylphenol), 2,2'-butylidene-bis(4-ethyl-6-t-butylphenol), 4,4'-thio-bis(3-methyl-6-t-butylphenol), 2,2'-methylene-bis[4-methyl-6-t-butylphenol], 2,2'-methylene-bis(4-methyl-t-butylphenol), 2,2'-methylene-bis(4-ethyl-t-butylphenol), 6-(2-benzotriazolyl)-4-t-octyl-6'-t-butyl-4'-methyl-2,2'-methylenebisphenol, styrene-modified phenols, 2,6-di-t-butyl-4-methylphenol, 2,4-dimethyl-6-(1-methylcyclohexyl)phenol, 2-[4,6-bis(2,4-dimethylphenyl)-1,3,5-triazine-2-yl]-5-(octyloxy)phenol, 2,6-di-t-butyl-4-ethylphenol, 2-(2H-benzotriazole-2-yl)-4-menthyl-6-(3,4,5,6-tetrahydrophthalimidylmethyl)phenol, 2-(4,6-diphenyl-1,3,5-triazine-2-yl)-5-[(hexyl)oxy]phenol, 2,5-di-t-butylhydroquinone, poly(2,2,4-trimethyl-1,2-dihydroquinone), 6-ethoxy-2,2,4-trimethyl-1,2-dihydroquinone, 2,5-di-t-amylhydroquinone, 4,4'-butylidene-bis(6-t-butyl-m-cresol), 2,2'-methylene-bis[6-(1-methylcyclohexyl)-p-cresol], 1-[2-{3-(3,5-di-t-butyl-4-hydroxyphenyl) propionyloxy}ethyl]-4-{3-(3,5-di-t-butyl-4-hydroxyphenyl) propionyloxy}-2,2,6,6-tetramethylpiperidine, S-(3,5-di-t-butyl-4-hydroxybenzyl)-2-ethyl-n-hexyl thioglycolate, 4,4'-thiobis(6-t-butyl-m-cresol), p-benzoquinone dioxime, 1,6-bis(4-benzoyl-3-hydroxyphenoxy)hexane, 1,4-bis(4-benzoyl-3-hydroxyphenoxy)butane, phenyl salicylate, 4-t-butylphenyl salicylate, 1,1,3-tris(2-methyl-t-butyl-4-hydroxy-5-t-butylphenyl)butane, 1,1-bis(4-hydroxyphenyl) cyclohexane, 3,9-bis[2-{3-(3-t-butyl-4-hydroxy-5-methylphenyl)propionyloxy}-1,1-dimethylethyl]-2,4,8,10-tetraoxaspiro[5,5]undecane, 2-t-butyl-6-(3'-t-butyl-5'-methyl-2'-hydroxybenzyl)-4-methylphenyl acrylate, polycondensates of diemthyl succinate acid and 1-(2-hydroxyethyl)-4-hydroxy-2,2,6,6-tetramethylpiperidine, condensates from methyl-3-[3-t-butyl-5-(2H-benzotriazol-2-yl)-4-hydroxyphenyl]propionate and polyethylene glycol, 3,4-dihydro-2,5,7,8-tetramethyl-2-(4,8,12-trimethyltridecyl)-2H-benzopyran-6-ol (Irganox E201), mixtures of Irganox E201, glycerol, and low-density polyethylene, mixtures of Irganox E201 and stearic acid, mixtures of bis(3,5-di-t-butyl-4-hydroxybenzylsulfonatoethyl)calcium and polyethylene wax, 2,4-bis[(octylthio)methyl]-o-cresol, N,N'-hexamethylene-bis(3,5-di-t-butyl-4-hydroxy-hydrocinnamide), 3,5-di-t-butyl-4-hydroxybenzyl phosphonate diethylester, 1,3,5-trimethyl-2,4,6-tris(3,5-di-t-butyl-4-hydroxybenzyl)benzene, and the like.

Examples of the compounds having a secondary amino group and a hydroxyl group in the molecule include 2-(3,5-di-t-butyl-4-hydroxybenzyl)-2-n-butylmalonate bis(1,2,2,6, 6-pentamethyl-4-piperidyl), 2,3-bis[{3-(3,5-di-t-butyl-4-hydroxyphenyl)propionyl}]propionohydrazide, 2,4-bis(n-octylthio)-6-(4-hydroxy-3,5-di-t-butylanilino)-1,3,5-triazine, and the like.

Examples of the compounds having a hydroxyl group and a carboxyl group in the molecule include 2-hydroxy-4-methoxy-2'-carboxybenzophenone, and the like.

Examples of the compounds having a mercapto group in the molecule include mercaptobenzothiazole and the like; and examples of the compounds having a secondary amino group and a mercapto group in the molecule include 2-mercaptobenzimidazole and the like.

A compound obtained by reacting the aging inhibitor with a silicon compound (compound (h)) having an organic group (I) containing an isocyanate group and having a silicon atom to which a hydrolysable group selected from alkoxy and acetoxy groups is directly bound may also be used as the aging inhibitor. Use of such a compound is effective in increasing the aging resistance.

The compound (h) is preferably obtained by reacting:
a compound having less than two active hydrogens of a secondary amino group and having a hydrolysable group selected from the group consisting of an alkoxy group and acetoxy group, which is directly bonded to 1 to 10 silicon atoms; or
a silicon compound having an organic group (III) containing a mercapto group or secondary amino group in one molecule, and having a hydrolysable group selected from the group consisting of an alkoxy group and acetoxy group which is directly bonded to 1 to 3 silicon atoms;
which is obtained by reacting; one or more of compounds having at least one organic group (II) selected from the group consisting of a primary amino group, secondary amino group and (meth) acryloyl group, and having the hydrolysable group which is directly bonded to 1 to 10 of silicon atoms; with an organic compound which is able to produce a compound having a secondary amino group by being reacted with the organic group (II);
with a compound having 2 or more of isocyanate groups in the molecule.

Examples of the thixotropic agents include anhydrous silica, fatty acid bisamide, hydrogenated castor oil, and the like.

Examples of the oligomers include polyethylene oligomers, liquid polypropylene, oligo styrene, liquid polychloroprene, liquid polyisoprene, liquid SBR, liquid NBR, liquid butyl rubbers, liquid isobutylene polymers, liquid polybutadiene, polyhydroxypolyolefinic oligomers, α-methylstyrene oligomers, phosphorus-containing styrene-α-methylstyrene oligomers, oligo ester acrylates, and the like. In addition, a naphthene-based, aromatic-based, or paraffin-based process oil may be added for adjustment of viscosity, reduction of tack, and others.

The silane-coupling agent is particularly preferably an aminosilane, and examples of the aminosilanes include γ-aminopropyltrimethoxysilane, γ-aminopropyltriethoxylsilane, γ-aminopropylmethyldimethoxysilane, γ-aminopropylmethyldiethoxysilane, aminophenyltrimethoxysilane, N-β (aminoethyl)-γ-aminopropyltrimethoxysilane, N-β (aminoethyl)-γ-aminopropyltriethoxylsilane, N-β (aminoethyl)-γ-aminopropylmethyldimethoxysilane, N-β (aminoethyl)-γ-aminopropylmethyldiethoxysilane, N-3-[amino(dipropyleneoxy)]aminopropyltrimethoxysilane, (aminoethylaminomethyl)phenethyltrimethoxysilane, N-(6-aminohexyl)aminopropyltrimethoxysilane, N-(2-aminoethyl)-11-aminoundecyltrimethoxysilane, N-phenyl-γ-aminopropyltrimethoxysilane, N-phenyl-γ-aminopropylmethyldimethoxysilane, N-(n-butyl)-γ-aminopropyltrimethoxysilane, N-(n-butyl)-γ-aminopropylmethyldimethoxysilane, N-ethylaminoisobutyltrimethoxysilane, N-methylaminopropylmethyldimethoxysilane, N-methylaminopropyltrimethoxysilane, bis(trimethoxysilylpropyl)amine, and the like.

The solvent is not particularly limited if it is compatible with the curable resin and contains water in an amount of 500 ppm or less.

Examples of the dehydrating agents include calcined lime, magnesium oxide, orthosilicic ester, anhydrous sodium sulfate, zeolite, methyl silicate, ethyl silicate, vinylalkoxysilane, various alkylalkoxysilanes (so-calledsilane-coupling agents), and the like.

Examples of the diluents include XPR-15, 22, 39, 40, UP-1000, 1010, 1020, 1021, 1061, 1070, 1080, and 1110, and UG-4010 (tradename, manufactured by Toagosei Co., Ltd.); UMB-1001, 2005, 2005B, and2005P, UME-1001, UMM-1001, 4005, UT-1001, 2001, 2001P, and 3001, AS-300 and 301, ASM-4001, CB-3060, and BGV-11 and 12 (trade name, manufactured by Soken Chemical & Engineering Co.); and the like.

In addition, the curable resin composition according to the invention may contain the silylated urethane resin described in U.S. Pat. Nos. 3,030,020 or 3,317,353 as needed.

The curable resin according to the invention has so low viscosity that the curable resin composition can be selected from a wide range, and the composition containing the resin as a component is characteristically superior in tensile-shear adhesive strength.

EXAMPLE

Hereinafter, the invention will be described in detail with reference to Examples.

Example 1

In a reaction container, placed were 100 g of DMDS (trade name, manufactured by Maruzen Petrochemical Co., Ltd., 1,5-dimercapto-3-thiapentane), 135 g of TSL8350 (trade name, manufactured by GE Toshiba Silicones, γ-glycidoxypropyltrimethoxysilane) and 1.0 g of 2,4,6-tris(dimethylaminomethyl)phenol, and the mixture was allowed to react under nitrogen atmosphere at 50° C. for 7 days, to give a synthetic product B-1.

In a reaction container, placed were 400 g of SDX-1690 (trade name, manufactured by Asahi Denka, a polyallylether having allyl groups at both terminals, number-average molecular weight: 3,000) and 90 g of the synthetic product B-1, and the mixture was heated to 90° C. under nitrogen atmosphere. Then, a mixture solution of 2 g of 2,2'-azobisisobutylonitrile (AIBN) and 10 g of toluene was added thereto dropwise over a period of 2 hours. The mixture was further allowed to react at the same temperature for 1 hour, to give a curable resin.

Example 2

In a reaction container, place were
100 g of DMDO (trade name, manufactured by Maruzen Petrochemical Co., Ltd., 1,8-dimercapto-3,6-dioxaoctane), 130 g of TSL8355 (trade name, manufactured by GE Toshiba Silicones, γ-glycidoxypropylmethyldimethoxysilane) and 1.0 g of 2,4,6-tris(dimethylaminomethyl)phenol, and the mixture was allowed to react under nitrogen atmosphere at 40° C. for 10 days, to give a synthetic product B-2.

In a reaction container, placed were 400 g of SDX-1690 and 80 g of the synthetic product B-2, and the mixture was heated to 90° C. under nitrogen atmosphere. Then, a mixture solution of 2 g of AIBN and 10 g of toluene was added thereto dropwise over a period of 2 hours. The mixture was further allowed to react at the same temperature for 1 hour, to give a curable resin.

Example 3

400 g of SDX-1690 and 45 g of DMDO were placed in a reaction container and heated to 90° C. under nitrogen atmosphere. Then, a mixture solution of 2 g of AIBN and 10 g of toluene was added dropwise thereto over a period of 2 hours. The mixture was further allowed to react at the same temperature for 1 hour, to give a synthetic product A-1.

The reaction product containing the synthetic product A-1 was allowed to cool to 70° C., and then, 70 g of TSL8355 and 0.5 g of 2,4,6-tris (dimethylaminomethyl)phenol were added, and the mixture was allowed to react under nitrogen atmosphere at 70° C. for 10 hours, to give a curable resin.

Comparative Example 1

Under nitrogen atmosphere, 100 g of KBM903 (trade name, manufactured by Shin-Etsu Chemical, γ-aminopropyltrimethoxysilane) and 113 g of 2-ethylhexyl acrylate were placed in a reaction container, and allowed to react while stirred at 35° C. for 20 days, to give a reaction product (1-1).

Into a reaction container containing 100 g of Sumidur T-80 (trade name, manufactured by Sumika Bayer Urethane, tolylene diisocyanate), added was 205 g of the reaction product (1-1) dropwise while the solution was stirred under nitrogen atmosphere, and the mixture was allowed to react at 80° C. for 5 hours, to give a reaction product (1-2) (synthetic isocyanatosilane).

500 g of P-3000 (trade name, manufactured by Asahi Denka, polyoxypropylene diol, number-average molecular weight: 3,000) and 280 g of the reaction product (1-2) were placed in a reaction container under nitrogen atmosphere, and the mixture was heated to 80° C. and allowed to react at the same temperature for 10 hours, to give a curable resin (silylated urethane resin).

Comparative Example 2

400 g of SDX-1690 and 45 g of KBM803 (trade name, manufactured by Shin-Etsu Chemical, γ-mercaptopropyltrimethoxysilane) were placed and heated to 90° C. in a reaction container under nitrogen atmosphere, and a mixture solution of 2 g of AIBN and 10 g of toluene was added thereto dropwise over a period of 2 hours. The mixture was further allowed to react at the same temperature for 1 hour, to give a curable resin.

Example 4

500 g of Polytail HA (trade name, manufactured by Mitsubishi Chemical Corp., polyolefin polyol) was placed in a reaction container and additionally, 28 wt % sodium methoxide methanol solution was added in such an amount that the number of sodium atom is 1.05 times with respect to the number of hydroxy groups in 1 molecule of the Polytail, and the mixture was stirred at 120° C. for 30 minutes. After removal of methanol under reduced pressure, 36 g of allyl chloride was then added and allowed to react for 1 hour. After removal of various unreacted components under reduced pressure, the mixture was purified by separating byproduct inorganic materials, to give a terminal allylated hydrocarbon polymer.

A curable resin was prepared in a similar manner to Example 2, except that SDX-1690 was replaced with the terminal allylated hydrocarbon polymer thus obtained and the amount of the synthetic product B-2 used was 65 g.

Comparative Example 3

Into a reaction container containing 82 g of Sumidur T-80, 200 g of the synthetic product B-2 obtained in Example 2 was added dropwise, and the mixture was allowed to react at 50° C. for 7 days, to give a product (isocyanatosilane). 200 g of the product obtained was added to 500 g of Polytail HA, and the mixture was allowed to react at 90° C. for 10 hours, to give a curable resin.

Example 5

500 g of UH-2030 (trade name, manufactured by Toagosei Co., Ltd., polyacrylic ester polyol) was placed in a reaction container, and 28 wt % sodium methoxide methanol solution was added additionally in such an amount that the number of sodium atom is 1.05 times with respect to the number of hydroxy groups in 1 molecule of the Polytail, and the mixture was stirred at 120° C. for 30 minutes. After removal of methanol under reduced pressure, 25 g. of allyl chloride was then added and allowed to react for 1 hour. After removal of various unreacted components under reduced pressure, the mixture was purified by separating byproduct inorganic materials, to give a terminal allylated hydrocarbon polymer.

A curable resin was prepared in a similar manner to Example 2, except that SDX-1690 was replaced with the terminal allylated hydrocarbon polymer thus obtained and the amount of the synthetic product B-2 used was 43 g.

Comparative Example 4

Into a reaction container containing 82 g of Sumidur T-80, 200 g of the synthetic product B-2 obtained in Example 2 was added dropwise, and the mixture was stored at 50° C. for 7 days, to give a product (isocyanatosilane). 160 g of the product obtained was added to 500 g of UH-2030 and allowed to react at 90° C. for 10 hours, to give a curable resin.

The viscosities of the curable resins obtained Examples 1 to 5 and the curable resins obtained in Comparative Examples 1 to 4 are determined and summarized in Table 1.

Further, to 400 g of each of the curable resins obtained in Examples 1 to 3 and the curable resins obtained in Comparative Examples 1 and 2, added were 4 g of tin catalyst (trade name: Stan No. 918, manufactured by Sankyo Organic Chemicals Co., Ltd.), 400 g of calcium carbonate having a water content adjusted to 500 ppm or less (trade name: NS2300, manufactured by Nitto Funka Kogyo K.K.), and 8 g of a silane-coupling agent (trade name: KBM603, manufactured by Shin-Etsu Chemical, N-β(aminoethyl)γ-aminopropyltrimethoxysilane), to give a curable resin composition.

Two stainless steel plates were adhered with the curable resin composition to obtain a laminate; the laminate was aged at 23° C. and a relative humidity of 60% for 7 days; and the tensile-shear adhesive strength (N/cm$^2$) of the laminate was determined according to the method of JIS K 6850. Results are summarized in Table 1.

TABLE 1

|  | Example 1 | Example 2 | Example 3 | Comparative Example 1 | Comparative Example 2 |
|---|---|---|---|---|---|
| Viscosity (mPa·s/23° C.) | 2,400 | 2,300 | 2,500 | 5,800 | 1,600 |
| Tensile-shear adhesive strength (N/cm$^2$) | 95 | 85 | 87 | 106 | 64 |

|  | Example 4 | Example 5 | Comparative Example 3 | Comparative Example 4 |
|---|---|---|---|---|
| Viscosity (mPa·s/23° C.) | 55,000 | 30,000 | 80,000 | 52,000 |

As apparent from the results shown in Table 1, the curable resin (silylated urethane resin) composition obtained in Comparative Example 1 is higher in adhesive strength but the resin is higher in viscosity, thus, imposing restrictions on use, while the resin compositions obtained in Examples 1 to 3 are higher in adhesive strength, and the resins have so low viscosity that the resin composition is open to utilization in various ways. In contrast, the curable resin composition obtained in Comparative Example 2 is smaller in adhesive strength.

In addition, the curable resin obtained in Example 4 has a viscosity significantly smaller than the curable resin obtained in Comparative Example 3. The curable resin obtained in Example 5 has a viscosity significantly smaller than the curable resin obtained in Comparative Example 4.

Example 6

100 g of 1,2-ethanedithiol, 248 g of TSL8350 (trade name, manufactured by GE Toshiba Silicones, γ-glycidoxypropyltrimethoxysilane) and 1.0 g of triethylamine were placed in a reaction container, and the mixture was allowed to react under nitrogen atmosphere at 50° C. for 7 days, and unreacted 1,2-ethanedithiol was removed at 100° C. under reduced pressure, to give a synthetic product B-3. Then, 600 g of polyallylether having allyl groups at both terminals (number-average molecular weight of 8,000) and 45 g of the synthetic product B-3 were placed in a reaction container and heated to 90° C. Then, a mixture solution of 2 g of AIBN and 10 g of toluene was added dropwise thereto over a period of 2 hours. The mixture was further allowed to react at the same temperature for 1 hour, to give a curable resin.

Comparative Example 5

600 g of the polyallylether used in Example 6 and 26.5 g of TSL8350 were placed in a reaction container and heated to 90° C. under nitrogen atmosphere, and then, a mixture solution of 2 g of AIBN and 10 g of toluene was added thereto dropwise over a period of 2 hours. The mixture was further allowed to react at the same temperature for 1 hour, to give a curable resin.

A tin catalyst, calcium carbonate, and a silane-coupling agent were added to the curable resin obtained in Example 6 or Comparative Example 5 in a similar manner to above, to give a curable resin composition; and the hardening velocity of the composition were determined; the composition obtained in Example 6 is shorter by approximately 1 minute in skinning period than that obtained in Comparative Example 5; and thus, curable resin compositions are prepared once again by using a milder amine catalyst as follows:

100 parts by weight of the curable resins obtained in Example 6 or Comparative Example 5, 100 parts by weight of calcium carbonate heavy dried to a water content of 500 ppm or less (trade name: NS400, manufactured by Nitto Funka Kogyo K.K.), and 10 parts by weight of KBM603 (as a curing catalyst for curable resin) were blended, to give a curable resin composition. The skinning periods of the curable resin compositions obtained were determined. Separately, two acrylic resin plates, two ABS resin plates, and two polycarbonate plates were adhered respectively by using the curable resin composition and the laminates were aged at 23° C. and a relative humidity of 60% for 7 days, and the tensile-shear adhesive strengths (N/cm$^2$) of these laminates were determined according to the method of JIS K 6850. Results are summarized in Table 2.

TABLE 2

|  | Plate adhered | Example 6 | Comparative Example 5 |
|---|---|---|---|
| Tensile-shear adhesive strength (N/cm$^2$) | Acrylic resin plates | 95 | 35 |
|  | ABS resin plates | 85 | 40 |
|  | Polycarbonate plates | 80 | 40 |
| Skinning period (min) |  | 330 | 700 |

As apparent from Table 2, the composition using the curable resin of Example 6 is significantly superior in hardenability to the composition using the curable resin of Comparative Example 5 having no hydroxyl group. It seems to be the result of the amine catalyst and moisture being attracted to the hydroxyl groups in the curable resin composition according to the invention, accelerating hydrolysis, and the results above demonstrate the difference in hardening velocity when a tin catalyst is used.

Preparative Example 1

(Preparation of Amino Group-Containing hydrolysable alkoxysilane by Michael Addition Reaction)

100.1 g of ethyl acrylate and 163.3 g of KBM902 (trade name, manufactured by Shin-Etsu Chemical, γ-aminopropylmethyldimethoxysilane) were placed in a reaction container, and the mixture was allowed to react while stirred under nitrogen atmosphere at 23° C. for 7 days, to give a reaction product (1-A). Similarly, 200.2 g of ethyl acrylate and 222.4 g of KBM603 were placed in a reaction container, and the mixture was allowed to react while stirred under nitrogen atmosphere at 23° C. for 7 days, to give a reaction product (1-B).

Preparative Example 2

(Preparation of Amino Group-Containing Compound (e) by Michael Addition Reaction)

100.1 g of ethyl acrylate and 57.1 g of allylamine were placed in a reaction container, and the mixture was allowed to react while stirred under nitrogen atmosphere at 50° C. for 7 days, to give a reaction product 2.

Preparative Example 3

(Preparation of Compounds (e) Having a Diisocyanate Group and a Substituted Urea, Thiourethane or Urethane Bond)

The compound shown in Table 3 or the reaction product 2 obtained in Preparative Example 2 and Sumidur T-80 at the ratio shown in Table 3 (parts by weight) were allowed to react while stirred under nitrogen atmosphere at 40° C. for 7 days, to give a reaction products 3-A, 3-B, 3-C, or 3-D.

TABLE 3

|  | Reaction product 3-A | Reaction product 3-B | Reaction product 3-C | Reaction product 3-D |
|---|---|---|---|---|
| Allyl alcohol | 58.1 | | | |
| Eugenol | | 164.2 | | |
| Allylmercaptan | | | 74.1 | |
| Reaction product 2 | | | | 157.2 |
| Sumidur T-80 | 174.2 | 174.2 | 174.2 | 174.2 |

Preparative Example 4

(Preparation of Compound (e))

The compound shown in Table 4 and reaction product 1-A or 1-B obtained in Preparative Example 1 at the ratio shown in Table 4 (parts by weight) were allowed to react while stirred under nitrogen atmosphere at 50° C. for 7 days, to give a reaction product 4-A, 4-B, 4-C, or 4-D. Similarly, the compound shown in Table 4 and the reaction product 1-A or 1-B obtained in Preparative Example 1, and the reaction product 3-A, 3-B, 3-C or 3-D obtained in Preparative Example 3 at the ratio shown in Table 4 (parts by weight) were allowed to react while stirred under nitrogen atmosphere at 40° C. for 1 day, to give a reaction product 4-E, 4-F, 4-G, 4-H, 4-I, or 4-J.

TABLE 4

|  | Reaction Product 4-A | Reaction Product 4-B | Reaction Product 4-C | Reaction Product 4-D | Reaction Product 4-E |
|---|---|---|---|---|---|
| Neopentyl glycol diacrylate | 212.0 | | | | |
| 1,6-hexanediol diacrylate | | 220.3 | | | |
| Light Ester G-201P (*1) | | | 214.0 | | |
| Light Acrylate TMP-A (*2) | | | | 296.0 | |
| m-TMI (*3) | | | | | 201.3 |
| Reaction Product 1-A | 263.4 | 263.4 | | | 263.4 |
| Reaction Product 1-B | | | 422.6 | 845.2 | |

|  | Reaction Product 4-F | Reaction Product 4-G | Reaction Product 4-H | Reaction Product 4-I | Reaction Product 4-J |
|---|---|---|---|---|---|
| Karenz MOI (*4) | 155.1 | | | | |
| Reaction Product 3-A | | 232.3 | | | |
| Reaction Product 3-B | | | 338.4 | | |
| Reaction Product 3-C | | | | 248.3 | |
| Reaction Product 3-D | | | | | 331.4 |
| Reaction Product 1-A | | 263.4 | | | 263.4 |
| Reaction Product 1-B | | | 422.6 | 422.6 | |
| KBM903 | 221.4 | | | | |

The compounds shown by trade name in Table 4 are as follows:

(*1) 2-Hydroxy-3-acryloyloxypropyl methacrylate, manufactured by Kyoeisha Chemical Co., Ltd.

(*2) Trimethylolpropane acrylate, manufactured by Kyoeisha Chemical Co., Ltd.

(*3) m-Isopropenyl - $\alpha, \alpha'$ -dimethylbenzyl isocyanate, manufactured by Takeda Chemical Industries, Ltd., (*4) 2-Isocyanatoethyl methacrylate, manufactured by Showa Denko K.K.

Preparative Example 5

(Preparation of Compound (e))

114 g of allyl glycidylether, 196 g of KBM803 and 1 g of triethylamine were placed in a reaction container and the mixture was allowed to react while stirred under nitrogen atmosphere at 50° C. for 7 days, to give a reaction product 5.

Examples 7 to 19 and Comparative Example 6

A mixture solution containing the compounds shown in Tables 5(1) and 5(2), the reaction products obtained in Preparative Examples above, laurylmercaptan and AIBN, and additionally as needed KBM503 (trade name, manufactured by Shin-Etsu Chemical, γ-methacryloxypropyltrimethoxysilane) in a reaction solvent of the curable resin obtained in Example 6 or Comparative Example 5 was added dropwise over a period of 5 hours, and the mixture was allowed to react at 100° C. for 2 hours, to give a curable resin. The viscosity of the curable resin obtained was determined by using a BS-type rotating viscometer, and the results are summarized in Tables 5(1) and 5(2).

TABLE 5

|  |  | Example 7 | Example 8 | Example 9 | Example 10 | Example 11 | Example 12 | Example 13 |
|---|---|---|---|---|---|---|---|---|
| Reaction solvent | Example 6 | 1,000 | 1,000 | 1,000 | 1,000 | 1,000 | 1,000 | 1,000 |
| Monomer mixture solution | n-Butyl acrylate | 480 | 480 | 480 | 480 | 480 | 480 | 480 |
|  | Reaction product 4-A | 20 |  |  |  |  |  |  |
|  | Reaction product 4-B |  | 20 |  |  |  |  |  |
|  | Reaction product 4-C |  |  | 20 |  |  |  |  |
|  | Reaction product 4-D |  |  |  | 20 |  |  |  |
|  | Reaction product 4-E |  |  |  |  | 20 |  |  |
|  | Reaction product 4-F |  |  |  |  |  | 20 |  |
|  | Reaction product 4-G |  |  |  |  |  |  | 20 |
|  | Reaction product 4-H |  |  |  |  |  |  |  |
|  | Reaction product 4-I |  |  |  |  |  |  |  |
|  | Reaction product 4-J |  |  |  |  |  |  |  |
|  | KBM503 |  |  |  |  |  |  |  |
|  | Laurylmercaptan | 10 | 10 | 10 | 10 | 10 | 10 | 10 |
|  | AIBM | 5 | 5 | 5 | 5 | 5 | 5 | 5 |
| Viscosity (Pa · s)/23° C. |  | 23 | 24 | 27 | 23 | 23 | 27 | 22 |

|  |  | Example 14 | Example 15 | Example 16 | Example 17 | Example 18 | Example 19 | Comparative Example 6 |
|---|---|---|---|---|---|---|---|---|
| Reaction solvent | Example 6 | 1,000 | 1,000 | 1,000 | 1,000 | 1,000 | 1,000 |  |
|  | Comparative Example 5 |  |  |  |  |  |  | 1,000 |
| Monomer mixture solution | n-Butyl acrylate | 480 | 480 | 480 | 480 | 480 | 480 | 480 |
|  | Reaction product 4-A |  |  |  |  |  |  |  |
|  | Reaction product 4-B |  |  |  |  |  |  |  |
|  | Reaction product 4-C |  |  |  |  |  |  |  |
|  | Reaction product 4-D |  |  |  | 100 |  |  |  |
|  | Reaction product 4-E |  |  |  |  |  |  |  |
|  | Reaction product 4-F |  |  |  |  |  |  |  |
|  | Reaction product 4-G |  |  |  |  |  |  |  |
|  | Reaction product 4-H | 20 |  |  |  |  |  |  |
|  | Reaction product 4-I |  | 20 |  |  |  |  |  |
|  | Reaction product 4-J |  |  | 20 |  |  |  |  |
|  | Reaction product 5 |  |  |  |  |  | 20 |  |
|  | KBM503 |  |  |  |  | 20 |  | 20 |
|  | Laurylmercaptan | 10 | 10 | 10 | 10 | 10 | 10 | 10 |
|  | AIBM | 5 | 5 | 5 | 5 | 5 | 5 | 5 |
| Viscosity (Pa · s)/23° C. |  | 23 | 35 | 34 | 12 | 20 | 23 | 17 |

Examples 20 to 32 and Comparative Example 7

1,000 g of each of the curable resins obtained in Examples 7 to 19 and Comparative Example 6 and 400 g of MR-10G (trade name: manufactured by Soken Chemical & Engineering Co., methacrylic acid resin powder) were placed in a planetary, and the mixture was heated, dehydrated, and blended under reduced pressure at 100° C.; and 5 g of KBM903 and 2.0 g of BF$_3$ piperidine complex were added thereto, to give a curable resin composition. These curable resin compositions were stored at 23° C. for half to one month and hardened at a temperature of 23° C. and a relative humidity of 60%; the skinning periods thereof were determined; and results are summarized in Table 6. Separately, a batula wood plate and a steel plate were adhered with each of these curable resin compositions in a similar manner to Examples 1 to 3 and Comparative Examples 1 and 2, and the tensile-shear adhesive strength of the laminate was determined; and results are summarized in Table 6.

TABLE 6

|  | Curable resin | Skinning period (min) | Tensile-shear adhesive strength (N/cm$^2$) |
|---|---|---|---|
| Example 20 | Example 7 | 3-5 | 142 |
| Example 21 | Example 8 | 3-5 | 133 |
| Example 22 | Example 9 | 3-5 | 136 |
| Example 23 | Example 10 | 3-5 | 130 |
| Example 24 | Example 11 | 2-4 | 148 |
| Example 25 | Example 12 | 2-4 | 146 |
| Example 26 | Example 13 | 2-4 | 138 |
| Example 27 | Example 14 | 2-4 | 132 |
| Example 28 | Example 15 | 2-4 | 136 |
| Example 29 | Example 16 | 2-4 | 147 |
| Example 30 | Example 17 | 2-4 | 152 |
| Example 31 | Example 18 | 10-15 | 134 |
| Example 32 | Example 19 | 10-15 | 146 |
| Comparative Example 7 | Comparative Example 6 | 40-60 | 125 |

As apparent from the results in Table 6, the tensile-shear adhesive strength of the laminate prepared by using the curable resin composition obtained in each Example were significantly larger, and the skinning period thereof was lower, than the tensile-shear adhesive strength and the skinning period of the laminate prepared by using the curable resin composition of Comparative Example 7. In contrast to the curable resin in the curable resin composition obtained in Comparative Example 7, which has no polar group (hydroxyl group) in the neighborhood of the hydrolysable group, the curable resin in the curable resin composition obtained in each Example has hydroxyl groups and has urethane bonds, urea bonds, substituted urea bonds, hydroxyl groups, and Michael addition reaction-derived nitrogen atoms in the neighborhood of the vinyl polymer-bound hydrolysable silicon group, which seemingly absorb the $BF_3$ piperidine complexes in the region close to these polar groups and accelerate the hardening velocity. In addition, these polar groups seem to be effective in improving the adhesive strength.

Example 33 and Comparative Example 8

100 parts by weight of the curable resins obtained in Example 6 or Comparative Example 5 and 50 parts by weight of Hakuenka CCR (trade name, manufactured by Shiraishi Kogyo, calcium carbonate) were heated and dehydrated under reduced pressure at 100° C. and then allowed to cool to room temperature; and 5 parts by weight of Alkamine K-54 (trade name, manufactured by Air Products, epoxy resin hardener) and 3 parts by weight of KBM903 were added thereto, to give a primary agent. Separately, 50 parts by weight of Epikote 828 (trade name, manufactured by Japan Epoxy Resins Co., Ltd., bisphenol A epoxy resin), 40 parts by weight of Hakuenka CCR and 3 parts by weight of Stan No. 918 were mixed, to give a hardener. The primary agent and the hardener were mixed at a ratio of 2:1 (weight ratio), to give a curable resin composition. The tensile-shear adhesive strength of the laminates prepared by using the curable resin composition in a similar manner to Examples 20 to 32 was determined, and the results are summarized in Table 7.

Example 34 and Comparative Example 9

100 parts by weight of the curable resins obtained in Example 6 or Comparative Example 5, 50 parts by weight of Epikote 828 and 40 parts by weight of Hakuenka CCR were heated and dehydrated under reduced pressure at 100° C. and allowed to cool to room temperature; and 15 parts by weight of Versamine 15N (trade name, manufactured by Cognis Japan, ketimine compound) and 3 parts by weight of KBM403 (trade name, manufactured by Shin-Etsu Chemical, γ-glycidoxypropyltrimethoxysilane) were mixed thereto, to give a curable resin composition primary agent. The tensile-shear adhesive strength of the laminates prepared by using the curable resin composition in a similar manner to Examples 20 to 32 was determined, and the results are summarized in Table 7.

Example 35 and Comparative Example 10

100 parts by weight of the curable resin obtained in Example 11 or Comparative Example 6 and 5 parts by weight of Alkamine K-54 were mixed, to give a primary agent. Separately, 50 parts by weight of Epikote 828 and 2 parts by weight of U-303 (trade name, manufactured by Nitto Kasei Co., Ltd., silver catalyst) were mixed, to give a hardener. The primary agent and the hardener were mixed at a ratio of 2:1 (weight ratio), to give a curable resin composition. The tensile-shear adhesive strength of the laminates prepared by using the curable resin composition in a similar manner to Examples 20 to 32 was determined, and the results are summarized in Table 7.

Example 36 and Comparative Example 11

100 parts by weight of the curable resin obtained in Example 11 or Comparative Example 6, 50 parts by weight of Epikote 828, and 40 parts by weight of Hakuenka CCR were heated and dehydrated under reduced pressure at 100° C., and then allowed to cool to room temperature; and 15 parts by weight of Versamine 15N (trade name, manufactured by Cognis Japan, ketimine compound) and 3 parts by weight of KBM403 (trade name, manufactured by Shin-Etsu Chemical, γ-glycidoxypropyltrimethoxysilane) were added thereto, to give a curable resin composition primary agent. The tensile-shear adhesive strength of the laminates prepared by using the curable resin composition in a similar manner to Examples 20 to 32 was determined, and the results are summarized in Table 7.

TABLE 7

| | Example | | | | Comparative Example | | | |
|---|---|---|---|---|---|---|---|---|
| | 33 | 34 | 35 | 36 | 8 | 9 | 10 | 11 |
| Tensile-shear adhesive strength (N/cm$^2$) | 485 | 285 | 520 | 325 | 405 | 235 | 460 | 275 |

As apparent from the results in Table 7, the tensile-shear adhesive strengths of the curable resin compositions prepared by using the curable resin obtained in Example 6 (Examples 33 and 34) and the curable resin compositions prepared by using the curable resin obtained in Example 11 (Example 35 and 36) were respectively greater than the tensile-shear adhesive strengths of the curable resin compositions prepared by using the curable resins obtained in Comparative Examples 5 and 6 (Comparative Example 8, 9, 10 and 11); it is seemingly because the curable resins obtained in Examples 6 and 11 have hydroxyl groups in the main chain of resin molecule, which bind to the hydroxyl groups generated by opening of epoxy rings and the ketimine compound via hydrogen bond, and thus, the tensile-shear adhesive strengths of these resins were significantly greater than those of the curable resins obtained in Comparative Examples 5 and 6 that have no hydroxyl group in the main chain of the resin.

INDUSTRIAL APPLICABILITY

The composition according to the invention may be used in various applications such as paint, adhesive, sealant, molding material, and coating agent. As an adhesive, the composition may be used in various applications such as general household adhesive, adhesive for internal finish work, adhesive for automobile, adhesive for audio systems, adhesive for production lines for example for electronic devices, adhesive for water cut-off materials for use in tunnel-shielding work. In addition, if the composition is used for production of a laminate material by adhering multiple members, the composition may be used as an adhesive for connecting multiple members before or after generation of tackiness of the adhesive after application of the adhesive on the members.

The invention claimed is:

1. A curable resin represented by the following General Formula (1) or (2):

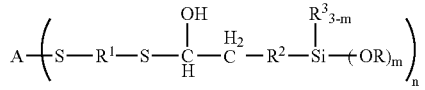  (1)

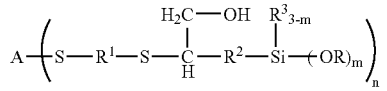  (2)

wherein, A represents a reactive residue of a polyvalent allyl compound having a polymer containing an polyoxyalkylene, (meth)acrylic ester or hydrocarbon polymer as the main chain skeleton and having an allyl group at the terminal; n is a number from 1 to 20, R represents an alkyl group having 1 to 6 carbon atoms; $R^1$ represents a bivalent organic group having a molecular weight of 10,000 or less; $R^2$ represents a bivalent organic group having a molecular weight of 200 or less; $R^3$ represents a hydrogen atom or an alkyl group having 1 to 6 carbon atoms; and m is a number of 1 to 3.

2. A method of producing the curable resin of according to claim 1, comprising the steps of: reacting a polyvalent allyl compound represented by the following General Formula (3) (compound a) with a polyvalent thiol compound represented by the following General Formula (4) (compound b) to give a terminal thiol compound represented by the following General Formula (5) (synthetic product A); and reacting the synthetic product A with an epoxysilane compound represented by the following General Formula (6) (compound c),

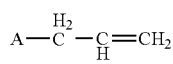  (3)

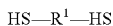  (4)

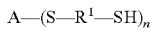  (5)

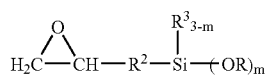  (6)

wherein, A, n, R, $R^1$, $R^2$, $R^3$ and m are the same as those described above.

3. A method of producing the curable resin according to claim 1, comprising the steps of: reacting the compound b with the compound c to give a mercaptosilane compound represented by the following General Formula (7) or (8) (synthetic product B); and reacting the synthetic product B with the compound a,

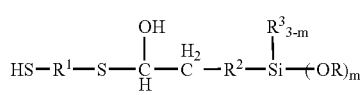  (7)

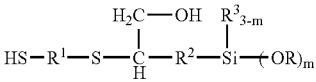  (8)

wherein, R, $R^1$, $R^2$, $R^3$, and m are the same as those described above.

4. A curable resin composition, comprising: 100 parts by weight of a curable resin, wherein the curable resin is represented by the following General Formula(1) or (2):

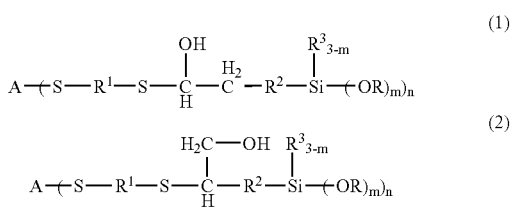

wherein, A represents a reactive residue of a polyvalent allyl compound having a polymer containing an polyoxyalkylene, (meth)acrylic ester or hydrocarbon polymer as the main chain skeleton and having an allyl group at the terminal; n is a number from 1 to 20, R represents an alkyl group having 1 to 6 carbon atoms; $R^1$ represents a bivalent organic group having a molecular weight of 10,000 or less; $R^2$ represents a bivalent organic group having a molecular weight of 200 or less; $R^3$ represents a hydrogen atom or an alkyl group having 1 to 6 carbon atoms; m is a number of 1 to 3; and 5 to 1,000 parts by weight of a vinyl polymer prepared by polymerization of a polymerizable vinyl monomer.

5. The curable resin composition according to claim 4, further comprising: a polymer formed from a compound having a reactive silicon group in the molecule, and having one or more nitrogen or sulfur atom-containing bonds selected from (thio)urethane, urea, substituted urea, and Michael addition reaction-derived chemical bonds or having a hydroxyl group in an amount of 1 to 50 wt % with respect to the total weight of said polymer and the vinyl polymer.

6. The method of producing a curable resin composition according to claim 4, wherein the polymerizable vinyl monomer is polymerized in the curable resin according to claim 1.

7. The method of producing the curable resin composition according to claim 5, comprising the step of conducting a polymerization of: a polymerizable vinyl monomer; and the compound having a reactive silicon group in the molecule, having one or more nitrogen or sulfur atom-containing bond selected from (thio)urethane, urea, substituted urea and Michael addition reaction-derived chemical bonds or having a hydroxyl group in the curable resin according to claim 1.

8. An adhesive composition, comprising the curable resin according to claim 1 and a curing catalyst for the curable resin.

9. An adhesive composition, comprising the curable resin composition according to claim 4 or 5 and a curing catalyst for the curable resin.

* * * * *